United States Patent [19]
Osawa et al.

[11] Patent Number: 5,309,756
[45] Date of Patent: May 10, 1994

[54] DEVICE FOR DETERMINING MALFUNCTION OF AN ENGINE CYLINDER

[75] Inventors: Kouichi Osawa; Kenichi Harada, both of Susono, Japan

[73] Assignee: Toyota Jidosha Kabushiki Kaisha, Toyota, Japan

[21] Appl. No.: 907,417

[22] Filed: Jul. 1, 1992

[30] Foreign Application Priority Data

| Jul. 4, 1991 | [JP] | Japan | 3-164731 |
| Jul. 12, 1991 | [JP] | Japan | 3-172799 |
| Aug. 13, 1991 | [JP] | Japan | 3-202762 |
| Sep. 9, 1991 | [JP] | Japan | 3-229167 |

[51] Int. Cl.$^5$ .......................... G01M 15/00
[52] U.S. Cl. ...................... 73/116; 123/419
[58] Field of Search ............ 73/116, 117.3; 123/419

[56] References Cited

U.S. PATENT DOCUMENTS

| 3,789,816 | 2/1974 | Taplin et al. | 123/119 R |
| 5,041,980 | 8/1991 | Maddock et al. | 73/116 X |
| 5,088,318 | 2/1992 | Osawa | 73/117.3 |
| 5,105,657 | 4/1992 | Nakaniwa | 73/117.3 |

FOREIGN PATENT DOCUMENTS

| 2507138 | 9/1976 | Fed. Rep. of Germany . |
| 3615547 | 11/1986 | Fed. Rep. of Germany . |
| 3916467 | 11/1990 | Fed. Rep. of Germany . |
| 52-26574 | 7/1977 | Japan . |
| 55-134724 | 10/1980 | Japan . |
| 61-258955(A) | 11/1986 | Japan . |
| 3-286166(A) | 12/1991 | Japan . |

*Primary Examiner*—Jerry W. Myracle
*Attorney, Agent, or Firm*—Kenyon & Kenyon

[57] ABSTRACT

A device for determining a malfunction of an engine cylinder of an internal combustion engine, comprising a first detection unit for detecting a first engine speed at a predetermined first crank angle, and a detecting second engine speed at a predetermined second crank angle, during a power stroke of two engine cylinders under a continuous combustion cycle, a difference calculating unit for calculating a difference between the first and second engine speeds, a misfire determining unit for determining that a misfire has occurred in a corresponding engine cylinder when the difference is outside a predetermined limit, a malfunction determining unit for determining that a malfunction has occurred in the corresponding engine cylinders when a frequency at which the misfire determining unit determines that a misfire has occurred is larger than a predetermined frequency, a second detection unit for detecting a current engine load, and a first changing unit for changing at least one of the predetermined limit and the predetermined frequency in accordance with the current engine load.

26 Claims, 25 Drawing Sheets

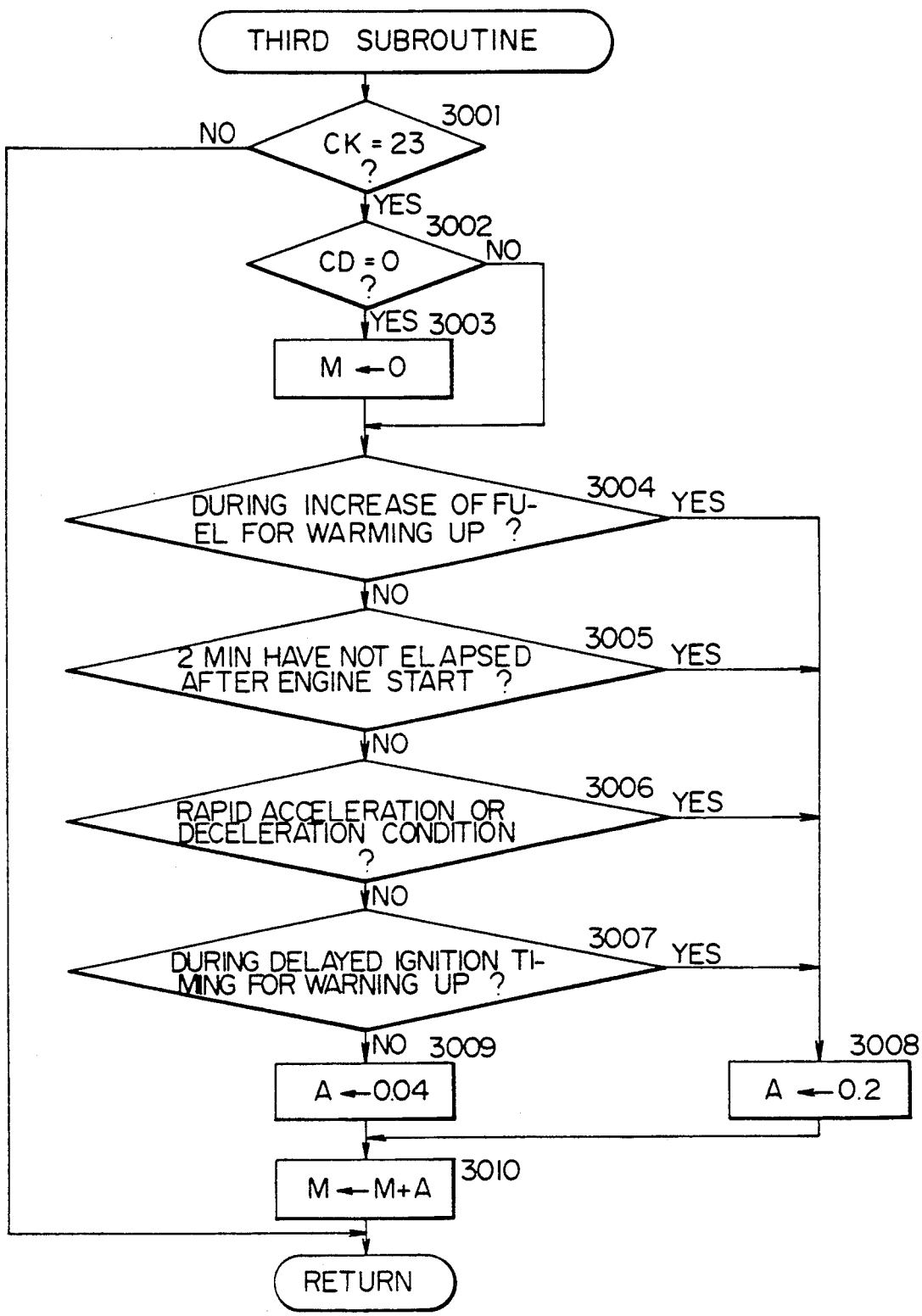

Fig. 22(A)

| CK | 1 | 2 | 3 | 4 | 5 | 6 | 7 | 8 | 9 | 10 | 11 | 12 |
|---|---|---|---|---|---|---|---|---|---|---|---|---|
| NO. 1 CYLINDER | 0 | 30 | 60 | 90 | 120 | 150 | 180 | 210 | 240 | 270 | 300 | 330 |
| NO. 3 CYLINDER | 540 | 570 | 600 | 630 | 660 | 690 | 0 | 30 | 60 | 90 | 120 | 150 |
| NO. 4 CYLINDER | 360 | 390 | 420 | 450 | 480 | 510 | 540 | 570 | 600 | 630 | 660 | 690 |
| NO. 2 CYLINDER | 180 | 210 | 240 | 270 | 300 | 330 | 360 | 390 | 420 | 450 | 480 | 510 |

Fig. 22(B)

| CK | 13 | 14 | 15 | 16 | 17 | 18 | 19 | 20 | 21 | 22 | 23 | 24 |
|---|---|---|---|---|---|---|---|---|---|---|---|---|
| NO. 1 CYLINDER | 360 | 390 | 420 | 450 | 480 | 510 | 540 | 570 | 600 | 630 | 660 | 690 |
| NO. 3 CYLINDER | 180 | 210 | 240 | 270 | 300 | 330 | 360 | 390 | 420 | 450 | 480 | 510 |
| NO. 4 CYLINDER | 0 | 30 | 60 | 90 | 120 | 150 | 180 | 210 | 240 | 270 | 300 | 330 |
| NO. 2 CYLINDER | 540 | 570 | 600 | 630 | 660 | 690 | 0 | 30 | 60 | 90 | 120 | 150 |

Fig. 23(A)

| CK | 1 | 2 | 3 | 4 | 5 | 6 | 7 | 8 | 9 | 10 | 11 | 12 |
|---|---|---|---|---|---|---|---|---|---|---|---|---|
| NO. 1 CYLINDER | 0 | 30 | 60 | 90 | 120 | 150 | 180 | 210 | 240 | 270 | 300 | 330 |
| NO. 5 CYLINDER | 600 | 630 | 660 | 690 | 0 | 30 | 60 | 90 | 120 | 150 | 180 | 210 |
| NO. 3 CYLINDER | 480 | 510 | 540 | 570 | 600 | 630 | 660 | 690 | 0 | 30 | 60 | 90 |
| NO. 6 CYLINDER | 360 | 390 | 420 | 450 | 480 | 510 | 540 | 570 | 600 | 630 | 660 | 690 |
| NO. 2 CYLINDER | 240 | 270 | 300 | 330 | 360 | 390 | 420 | 450 | 480 | 510 | 540 | 570 |
| NO. 4 CYLINDER | 120 | 150 | 180 | 210 | 240 | 270 | 300 | 330 | 360 | 390 | 420 | 450 |

Fig. 23(B)

| CK | 13 | 14 | 15 | 16 | 17 | 18 | 19 | 20 | 21 | 22 | 23 | 24 |
|---|---|---|---|---|---|---|---|---|---|---|---|---|
| NO. 1 CYLINDER | 360 | 390 | 420 | 450 | 480 | 510 | 540 | 570 | 600 | 630 | 660 | 690 |
| NO. 5 CYLINDER | 240 | 270 | 300 | 330 | 360 | 390 | 420 | 450 | 480 | 510 | 540 | 570 |
| NO. 3 CYLINDER | 120 | 150 | 180 | 210 | 240 | 270 | 300 | 330 | 360 | 390 | 420 | 450 |
| NO. 6 CYLINDER | 0 | 30 | 60 | 90 | 120 | 150 | 180 | 210 | 240 | 270 | 300 | 330 |
| NO. 2 CYLINDER | 600 | 630 | 660 | 690 | 0 | 30 | 60 | 90 | 120 | 150 | 180 | 210 |
| NO. 4 CYLINDER | 480 | 510 | 540 | 570 | 600 | 630 | 660 | 690 | 0 | 30 | 60 | 90 |

DEVICE FOR DETERMINING MALFUNCTION OF AN ENGINE CYLINDER

BACKGROUND OF THE INVENTION

1. Field of the Invention

The present invention relates to a device for determining a malfunction of an engine cylinder of an internal combustion engine.

2. Description of the Related Art

When a malfunction such as a serious misfiring occurs in an engine cylinder, the engine torque drops and imburst fuel is often discharged from the engine cylinder and leaks therefrom onto surrounding parts of the engine. Accordingly, it is important that a driver know of the malfunction, and deal with same at an early stage.

Japanese Unexamined Patent Publication No. 61-258955 discloses a device for determining a malfunction in an cylinder of a multicylinder engine. In this device an engine speed in the power stroke of each engine cylinder is detected, and the difference between the two engine speeds for two successive power strokes is calculated. When the difference is larger than a predetermined constant reference value, it is determined that a misfire has occurred in the engine cylinder with a delayed power stroke, and accordingly, a misfire count value is incremented by "1". The routine is carried out a predetermined intervals, and when the misfire count value becomes larger than a predetermined malfunction determining value, it is determined that a malfunction has occurred in the engine cylinder.

In the above device, the predetermined constant reference value is made relatively small, to thereby determine a misfire without fail under all engine driving conditions. Therefore, according to an engine driving condition, the difference can be larger than the predetermined constant reference value even though a misfire has not occurred, and thus the misfire count value becomes larger than the predetermined malfunction determining value, and accordingly, it is determined that a normal functioning cylinder is a malfunctioning cylinder.

SUMMARY OF THE INVENTION

Therefore, an object of the present invention is to provide a device capable of accurately determining a malfunction in an engine cylinder.

According to the present invention there is provided a device comprising: a first detection means for detecting a first engine speed at a predetermined first crank angle, and a second engine speed at a predetermined second crank angle, during the power stroke of two engine cylinders under a continuous combustion cycle; a difference calculating means for calculating a difference between the first and second engine speeds; a misfire determining means for determining that a misfire has occurred in a corresponding engine cylinder when said difference is outside a predetermined limit; a malfunction determining means for determining that a malfunction has occurred in said corresponding engine cylinder when a frequency at which said misfire determining means determines that a misfire has occurred is larger than a predetermined frequency; a second detection means for detecting a current engine load; and a first changing means for changing at least one of the predetermined limit and the predetermined frequency in accordance with the current engine load.

The present invention will be more fully understood from the description of preferred embodiments of the invention set forth below, together with the accompanying drawings.

BRIEF DESCRIPTION OF THE DRAWINGS

In the drawings:

FIG. 16 is a third subroutine;

FIG. 22 (including parts A and B) is a first table showing crank arm angles of each cylinder in a four-cylinder engine, with respect to a crank angle count value;

FIG. 23 (including parts A and B) is a second table showing crank arm angles of each cylinder in a six-cylinder engine, with respect to a crank angle count value;

DESCRIPTION OF THE PREFERRED EMBODIMENTS

Figure 1:
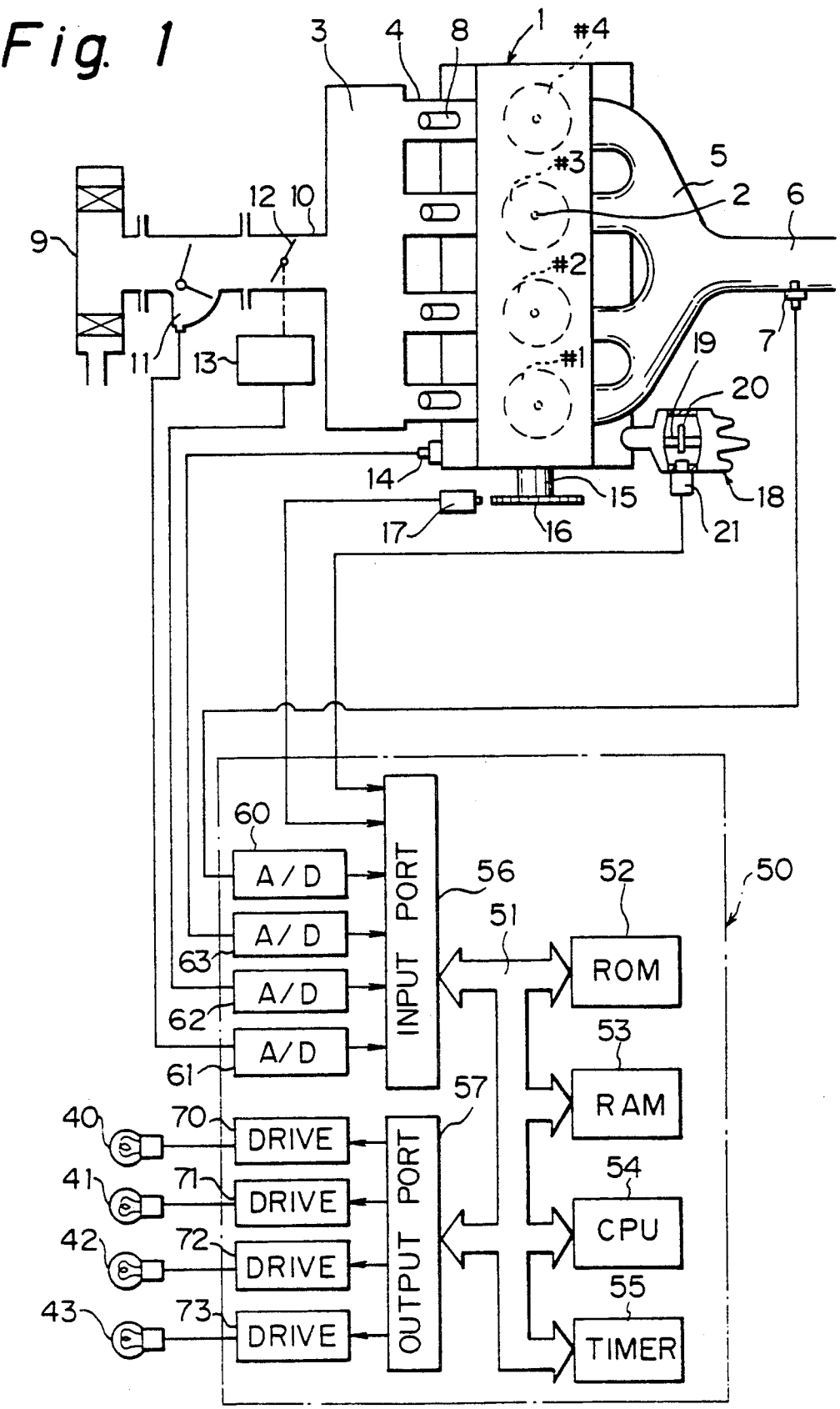
FIG. 1 is a schematic view of a first internal combustion engine.

Referring to FIG. 1, the first internal combustion engine 1 is provided with four cylinders: No 1 cylinder #1, No. 2 cylinder #2, No. 3 cylinder #3, and No. 4 cylinder #4. Each of the cylinders #1 to #4 is provided with an ignition plug 2 and is connected to a surge tank 3 through a corresponding branch pipe 4, and further, is connected to an exhaust manifold 5. An oxygen sensor 7 for detecting an oxygen density in the exhaust gas is arranged in a exhaust duct 6 downstream of the exhaust manifold 5. A fuel injector 8 is mounted in each of the branch pipes 4. The surge tank 3 is connected to an air cleaner 9 through a suction duct 10 and an air flow meter 11. A throttle valve 12 is disposed in the suction duct 10, and a throttle sensor 13 for detecting the opening of the throttle valve 12 is attached thereto. The first internal combustion engine 1 is provided with a water temperature sensor 14 for detecting the temperature of the engine cooling water. The crankshaft 15 of the engine 1 is provided with a disc-shaped rotor 16, and a crank angle sensor 17 is disposed at the outer circumference of the rotor 16, opposing thereto. The internal combustion engine 1 is fitted with a distributor 18 provided with a shaft 19 turning at a speed one-half that of the crankshaft 15. A disc-shaped rotor 20 is mounted in the shaft 19, and a TDC sensor 21 is disposed at the Outer circumference of the rotor 20, opposing thereto.

The electronic control unit 50 (ECU) is constructed as a digital computer and includes a ROM (read only memory) 52, a RAM (random access memory) 53, a CPU (microprocessor, etc.,) 54, a timer, 55, an input port 56, and an output port 57, which are interconnected by a bidirectional bus 51. The timer 55 is comprised of a free running counter which performs a count-up function when power is supplied to the ECU 50; i.e., the count of the free runing counter shows a time. The oxygen sensor 7, the air flow meter 11, the throttle sensor 13 and the water temperature sensor 14 are connected to the input port 56 via corresponding AD converters 60, 61, 62, and 63, respectively. Further, the output signals of the crank angle sensor 17 and the TDC sensor 21 are input to the input port 56. Also, an igniter (not shown) for supplying a high voltage to the distributor 21, and the injectors 8, are connected to the output port 57 via corresponding drive circuits (not shown) respectively. Further, the output port 57 is connected through corresponding drive circuits 70, 71, 72, and 73 to an alarm lamp 40 showing that the No. 1 cylinder #1 has malfunctioned, an alarm lamp 41 showing that the No. 2 cylinder #2 has malfunctioned, an alarm lamp 42 showing that the No. 3 cylinder #3 has malfunctioned, and an alarm lamp 43 showing that the No. 4 cylinder #4 has malfunctioned.

Figure 2:
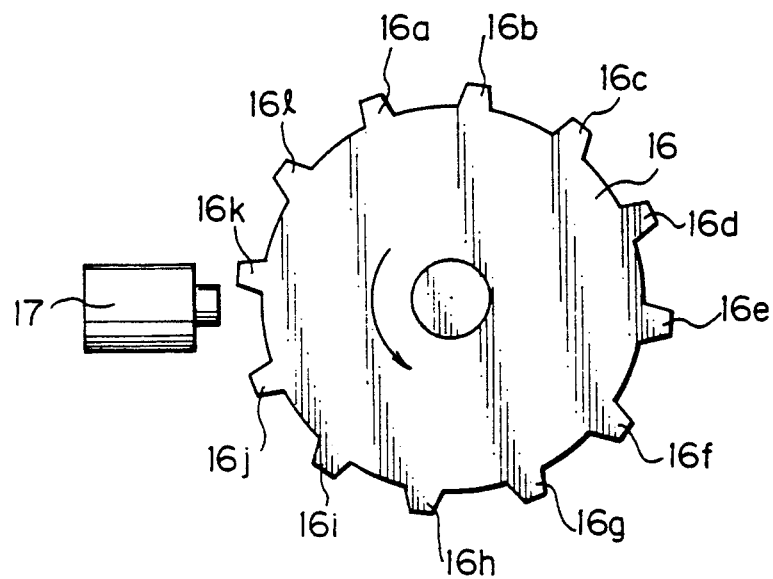
FIG. 2 is a front view of a rotor.

FIG. 2 shows the rotor 16 and the crank angle sensor 17. The rotor 16 has 12 outer teeth 16a to 16l formed equiangularly at every 30° degrees circumferentially thereof. The crank angle sensor 17 is comprised of an electromagnetic pickup that issues an output pulse when facing the outer teeth 16a to 16l. Therefore, it will be understood that the outer teeth 16a to 16l constitute detectable elements. When the crankshaft 15 is rotated, i.e., when the rotor 16 is turned in the direction of the arrow in FIG. 2, the crank angle sensor 17 issues an output pulse each time the crankshaft 15 rotates by 30° degrees, and the output pulse is input to the input port 56.

Figure 3:
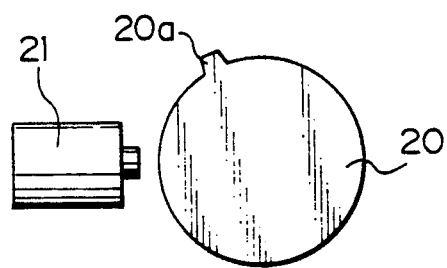
FIG. 3 is a front view of an another rotor.
Figure 4:
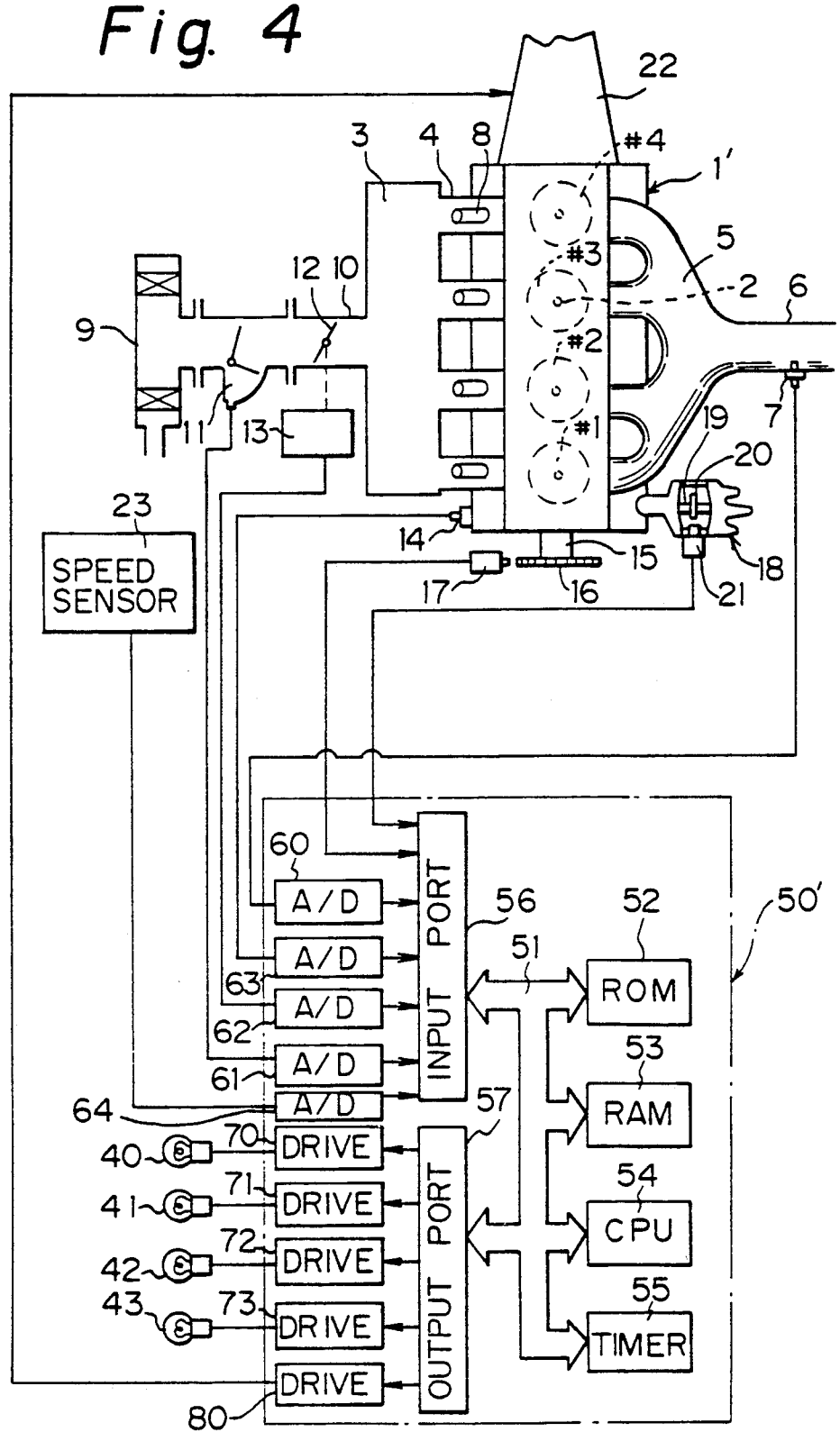
FIG. 4 is a schematic view of a second internal combustion engine.

FIG. 3 shows the rotor 20 and the TDC sensor 21. The rotor 20 has a single projection 20a, and the TDC sensor 21 is comprised of an electromagnetic pickup that issues an output pulse when facing the projection 20a. As mentioned before, the rotor 20 is turned at a rotational speed one-half that of the crankshaft 15. Therefore, when the crankshaft 15 is rotated, the TDC sensor 21 issues an output pulse every time the crankshaft 15 rotates by 720° degrees and this output pulse is input to the input port 56. The projection 20a is arranged so as to face the TDC sensor 21 when, for example, the No. 1 cylinder #1 reaches the TDC of the power stroke thereof. Namely, the TDC sensor 21 issues an output pulse when the No. 1 cylinder #1 reaches the TDC of the power stroke thereof.

The ECU 50 usually controls the igniter so as to obtain a good ignition timing at each engine cylinder #1, #2, #3, and #4, in response to a current engine speed N and a current engine load Q/N (amount of intake air Q/engine speed N) calculated on the basis of signals from the crank angle sensor 17 and the air flow meter 11. The ECU 50 also carries out a feedback control of an amount of fuel injected from the injectors 8, on the basis of a signal from the oxygen sensor 7, to thereby supply a suitable amount of fuel to all of the engine cylinders #1, #2, #3 and #4 under all engine driving conditions.

Figure 8:
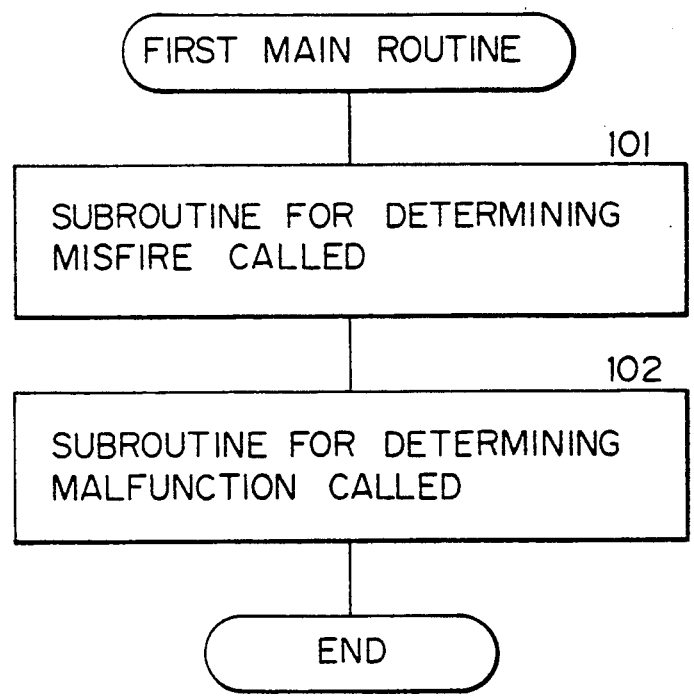
FIG. 8 is a first main routine for determining a malfunction of an engine cylinder.

Further, the ECU 50 determines a malfunction in an engine cylinder according to a first main routine shown in FIG. 8. Note that the first main routine is executed at every 30° degrees crank angle (CA).

Figure 14:
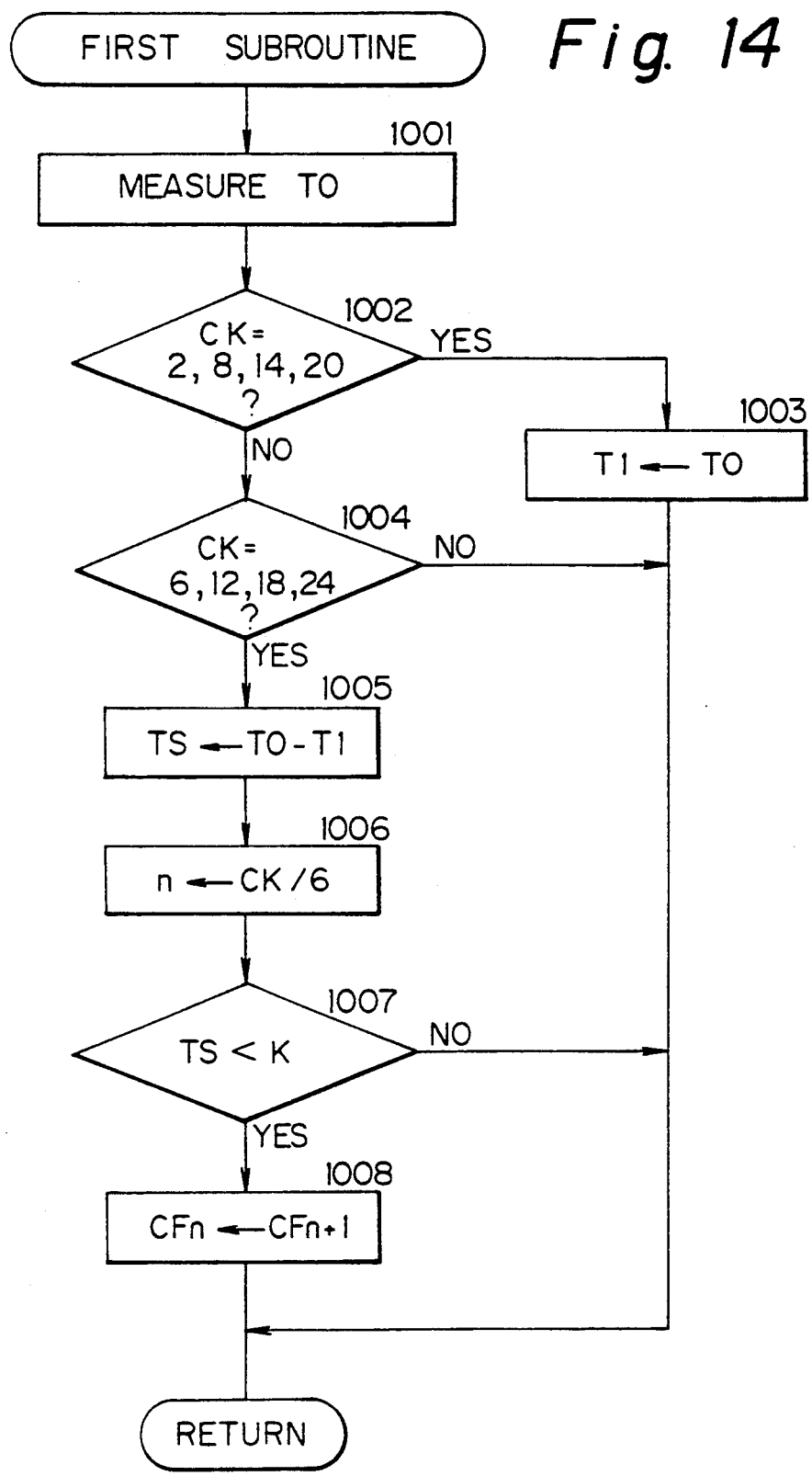
FIG. 14 is a first subroutine.

Referring to FIG. 8, at step 101 a subroutine for determining a misfire, as a first subroutine, is called The first subroutine is shown in FIG. 14. Referring to FIG. 14, at step 1001 the time T0 elapsed between this interruption and the previous interruption is measured by the timer 55. Then, at step 1002, it is determined if a crank angle count value CK is any one of "2", "8", "14", and "20".

Figure 12:
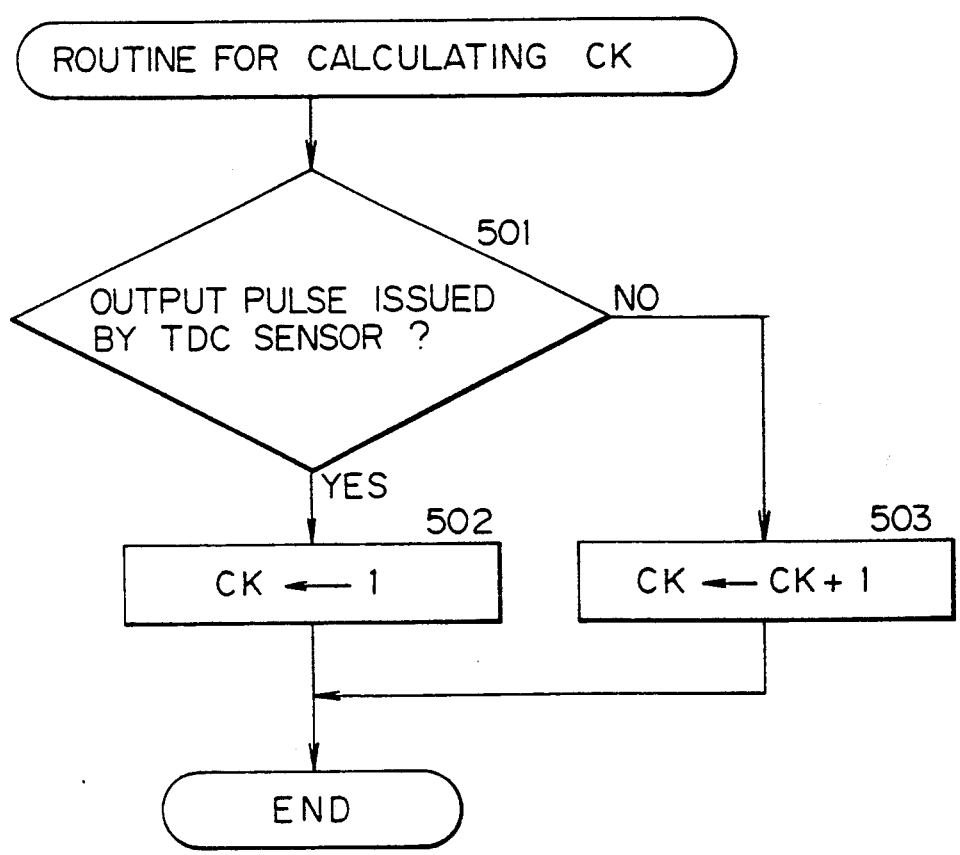
FIG. 12 is a routine for calculating a crank angle count value.

Note that the crank angle count value CK is calculated in a routine shown in FIG. 12. The routine is executed at every 30° degrees CA, at the same time as the first main routine. Referring to FIG. 12, at step 501 it is determined if an output pulse has been issued by the TDC sensor 21, at the same time as this interruption. When the result is affirmative, i.e., the No. 1 cylinder #1 has reached the TDC of the power stroke thereof, the routine goes to step 502 and the crank angle count value CK is made "1". When the result is negative, the routine goes to step 503 and the crank angle count value CK is incremented by "1". Note that, in the four-cylinder engine shown in FIG. 1, the ignition sequence is #1-#3-#4-#2, and an angle of a crank arm in each cylinder with respect to the crank angle count value CK is shown as a first table in FIG. 22.

Returning to the first subroutine of FIG. 14, at step 1002, when the crank angle count value CK is any one of "2", "8", "14", and "20", i.e., the crank arm angle in any one of the cylinders #1, #2, #3, #4 has reached 30° degrees (cf. the first table shown in FIG. 22), the routine goes to step 1003 and the time T0 is made the time T1, and the process then returns to the first main routine of FIG. 8. Further, at step 1002, when the crank angle count value CK is not "2", "8", 14", and "20", the routine goes to step 1004 and it is determined if the crank angle count value CK is any one of "6", "12", "18", and "24". When the crank angle count value CK is not "6", "12", "18", and "24", the process returns to the first main routine in FIG. 8. When the crank angle count value CK is any one of "6", "12", "18". and "24", i.e., the crank arm angle in any one of the cylinders #1, #2, #3, #4 has reached 150° degrees (cf. the first table shown in FIG. 22), the routine goes to step 1005 and a difference TS between the time T0 and the time T1 is calculated. Note that, in the power stroke of an engine cylinder, the time T0 is a time elapsed from a 120° degrees to a angle in the engine cylinder, and the time T1 is a time elapsed from a TDC to a 30° degrees crank arm angle in the engine cylinder. At step 1005, a difference between the engine speed V0 obtained from the time T0 and the engine speed V1 obtained from the time T1 may be calculated.

Next, at step 1006, the crank angle count value CK is divided by "6", and the result "n" expresses the ignition sequence number of the engine cylinder.

Figure 20A:
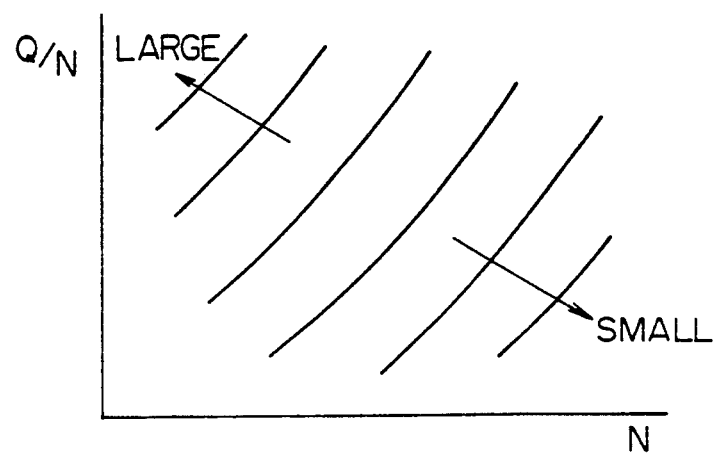
FIG. 20 (including parts A and B) shows a map for determining a set value K.
Figure 20B:
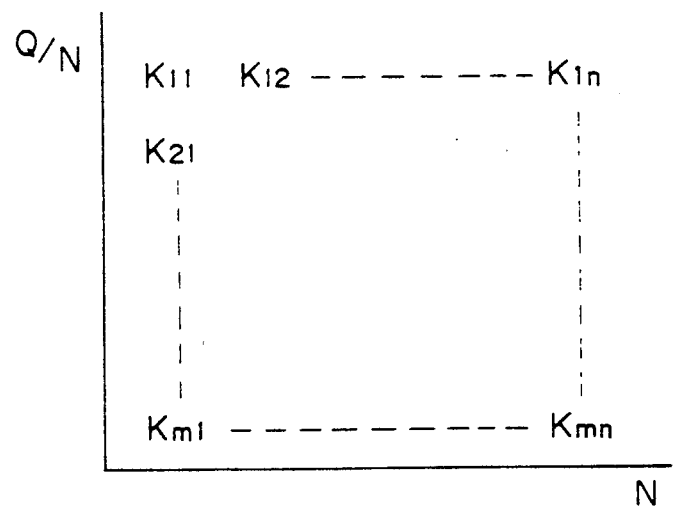

Then, at step 1007 it is determined if the difference TS is smaller than a set value K. If the engine cylinder is a normal functioning cylinder, an engine speed at the early stage of the power stroke is larger than that at the late stage thereof, and thus the time T0 elapsed in the late stage is longer than the time T1 in the early stage. Note, the difference TS in the normal functioning cylinder changes in response to an engine speed N and load Q/N, so that a difference TS in the normal functioning cylinder is assumed with respect to all engine speeds N and loads Q/N, and is stored as the set value K in the form of a map shown in FIG. 20(B). FIG. 20(A) shows a tendency of the map in FIG. 20(B).

Accordingly, when the result is affirmative at step 1007, a misfire has occurred in the engine cylinder, and the routine goes to step 1008 and a misfire count value CFn of a corresponding engine cylinder is incremented by "1". Then, the process returns to the first main routine. Conversely, when the result at step 1007 is negative, the misfire count value CFn is maintained as it is and the process returns to the first main routine.

Figure 15:
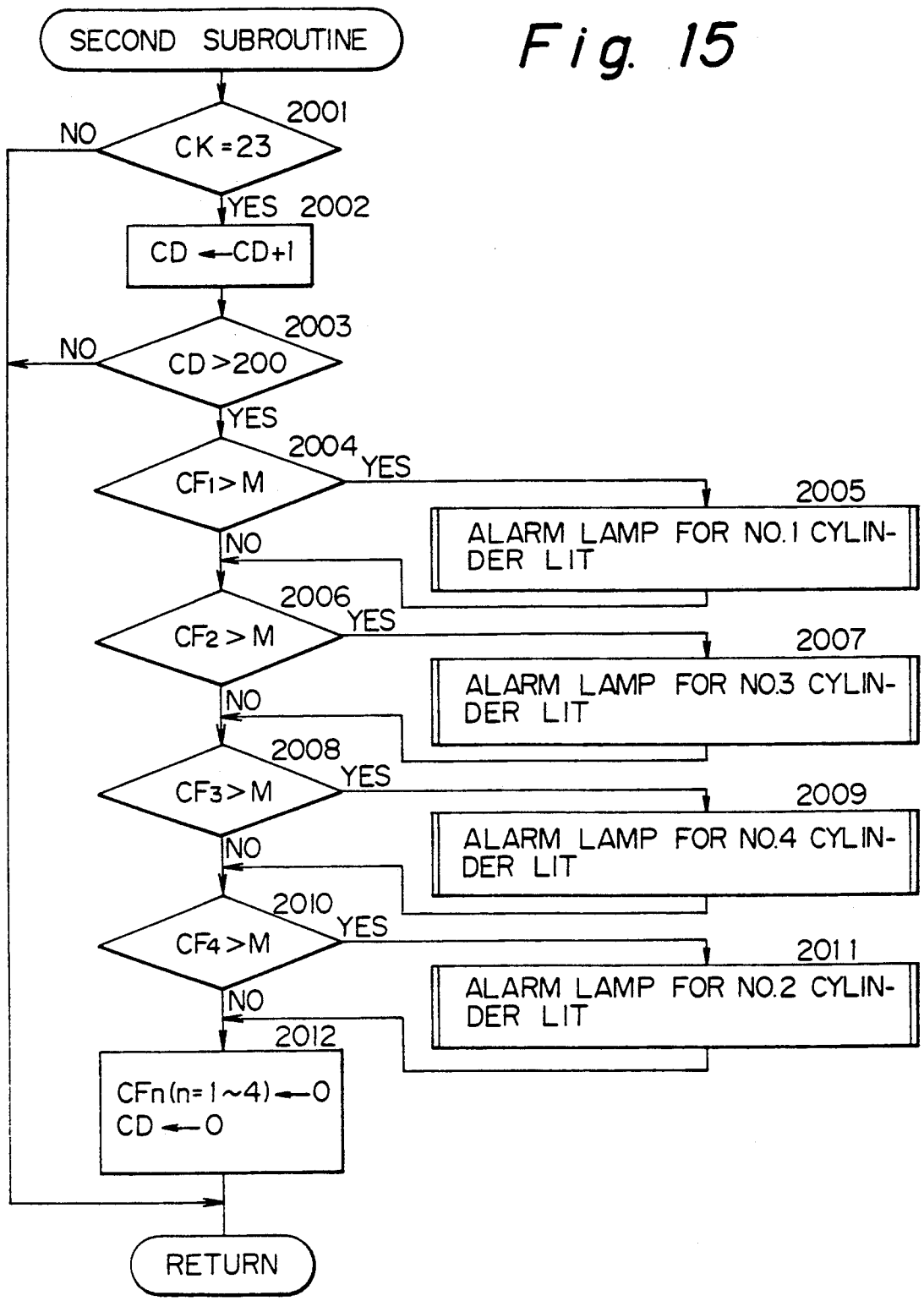
FIG. 15 is a second subroutine.

In the first main routine in FIG. 8, at step 102, a subroutine for determining a malfunction, as a second subroutine, is called. The second subroutine is shown in FIG. 15. Referring to FIG. 15, at step 2001 it is determined if the crank angle count value CK is "23". When the result is affirmative, the routine goes to step 2002 and an ignition count value CD is incremented by "1".

Next, at step 2003 it is determined if the ignition count value CD has reached "200". When the result at step 2001 or step 2003 is negative, the process returns to the first main routine in FIG. 8. When the result at step 2003 is affirmative, i.e., the ignition times in each cylinder have reached "200", the routine goes to step 2004 and it is determined if the misfire count value CF1 is larger than a malfunction determining value M. Note, in the first main routine, the malfunction determining value M is constant. When the result is negative, the routine goes to step 2006, and when the result is affirmative, i.e., for No. 1 engine cylinder in the ignition sequence, the misfiring times during 200 ignition times is larger than the malfunction determining value M, the routine goes to step 2005 and it is determined that a malfunction has occurred in the No. 1 cylinder #1, and thus the alarm lamp 40 for the No. 1 cylinder is lit.

Next, at step 2006 it is determined if the misfire count value CF2 is larger than the malfunction determining value M. When the result is negative, the routine goes to step 2008, and when the result is affirmative, i.e., for No.2 engine cylinder in the ignition sequence, the misfiring times during 200 ignition times is larger than the malfunction determining value M, the routine goes to step 2007 and it is determined that a malfunction has occurred in the No. 3 cylinder #3, and thus the alarm lamp 42 for the No. 3 cylinder is lit.

Next, at step 2008 it is determined if the misfire count value CF3 is larger than the malfunction determining value M. When the result is negative, the routine goes to step 2010, and when the result is affirmative, i.e., for No. 3 engine cylinder in the ignition sequence, the misfiring times during 200 ignition times is larger than the malfunction determining value M, the routine goes to step 2009 and it is determined that a malfunction has occurred in the No. 4 cylinder #4, and thus the alarm lamp 43 for the No. 4 cylinder is lit.

Next, at step 2010 it is determined if the misfire count value CF4 is larger than the malfunction determining value M. When the result is negative, the routine goes to step 2012, and when the result is affirmative, i.e., for No. 4 engine cylinder in the ignition sequence, the misfiring times during 200 ignition times is larger than the malfunction determining value M, the routine goes to step 2011 and it is determined that a malfunction has occurred in the No. 2 cylinder #2, and thus the alarm lamp 41 for the No. 2 cylinder is lit.

Then, at step 2012 the misfire count values CF1, CF2, CF3, CF4 and the ignition count value CD are made "0", and the process returns to the first main routine. Note, when any one of the alarm lamps is lit, the fuel injection and the ignition in the corresponding cylinder may be stopped during a predetermined engine driving condition.

According to the first main routine, the set value K used for determining a misfire is changed in response to an engine speed N and load Q/N, and accordingly, the determination of a misfiring is more accurate than that of the above-mentioned related art.

Figure 21A:
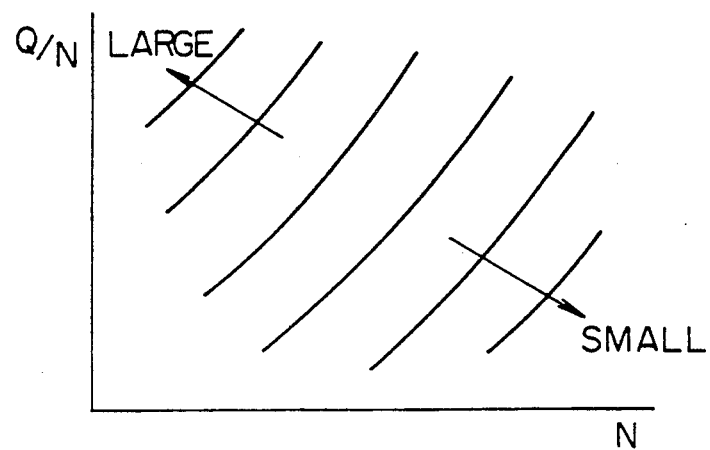
FIG. 21 (including parts A and B) shows a map for determining a malfunction determining value M.
Figure 21B:
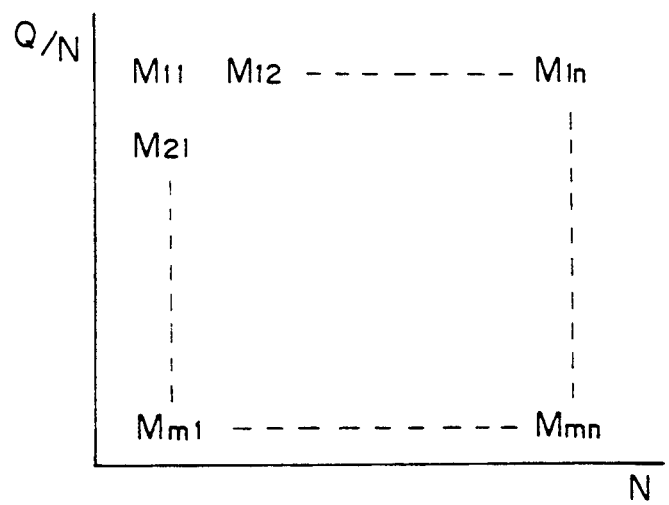

Note, in the first main routine, the set value K in the first subroutine can be made a constant value, and the malfunction determining value M in the second subroutine be changed in response to the engine speed N and load Q/N, from a map shown in FIG. 21(B). FIG. 21(A) shows a tendency of the map in FIG. 21(B).

Figure 9:
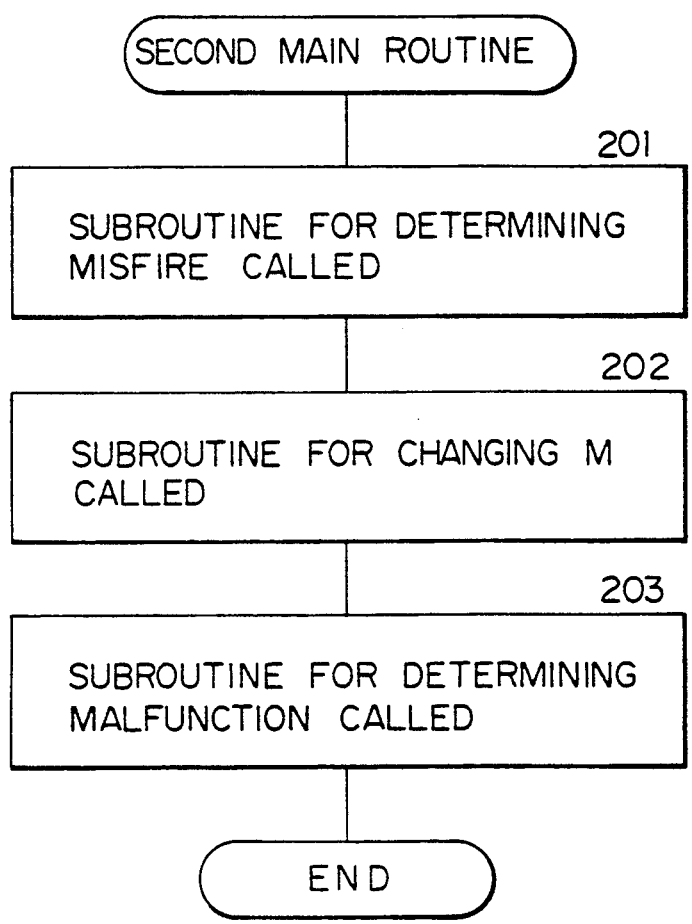
FIG. 9 is a second main routine for determining a malfunction of an engine cylinder.

FIG. 9 illustrates a second main routine for determining a malfunction of an engine cylinder. In the second main routine, at step 201 the subroutine for determining a misfire is called, as for the first main routine. Next, at step 202 a subroutine for changing the malfunction determining value M, as a third subroutine, is called. Finally, at step 203, the subroutine for determining a malfunction is called, as for the first main routine.

The third subroutine is shown in FIG. 16. First, at step 3001 it is determined if the crank angle count value CK is "23". When the result is negative, the process returns to the second main routine.

When the result is affirmative, the routine goes to step 3002 and it is determined if the ignition count value CD is "0". As above-mentioned, when the ignition count value CD reaches "200", the determining of a malfunction is carried out by the subroutine for determining a malfunction, and the ignition count value CD is made "0". Accordingly, when the ignition count value CD is "0", the routine goes to step 3003 and the malfunction determining value M is made "0". When the ignition count value is not "0", the routine jumps to step 3004.

At step 3004, it is determined if an increase of fuel for warming up is being carried out. Note, this fuel control is carried out in the other main routine (not shown) for the injectors 8, on the basis of signals from the water temperature sensor 14 and the like. When the result is negative, the routine goes to step 3005 and it is determined if two minutes have not elapsed since the engine was started. When the result is negative, the routine goes to step 3006 and it is determined whether the engine is being rapidly accelerated or decelerated. When the result is negative the routine goes to step 3007 and it is determined if the ignition timing has been delayed for warming up. Note, this ignition timing control is carried out in the other main routine (not shown) for the igniter, on the basis of signals from the water temperature sensor 14 and the like.

Here, if any one of the results at steps 3004 to 3007 is affirmative, i.e., the current engine driving condition is a transient condition, the routine goes to step 3008 and an increment value A for changing the malfunction determining value M is made "0.2". When all of the results are negative, however, i.e., the current engine driving condition is a steady condition, the routine goes to step 3009 and the increment value A is made "0.04". Next, at step 3010 the malfunction determining value M is incremented by the increment value A "0.2" or "0.04".

As in the first main routine, the subroutine for determining a malfunction is not carried out as long as the ignition times do not reach "200", and thus the third subroutine is repeated 200 times. If while the third subroutine is repeated, the engine driving condition maintains a steady condition, the malfunction determining value M becomes as small as "8" (0.04 * 200). If while the third subroutine is repeated, the engine driving condition maintains a transient condition, the malfunction determining value M becomes as large as "40" (0.2 * 200).

In the transient condition, the engine speed changes beyond the assumption of the engine speed N and load Q/N, and therefore, in the first subroutine, it can be determined that a misfire has occurred in an engine cylinder even though it is functioning normally. According to the third subroutine, however, the longer the engine is driven in the transient condition, the larger becomes the malfunction determining value M, and thus the determining of a malfunction in the second main routine is more accurate than that in the first main routine.

Note, in the third subroutine, when the engine is in any one of the transient driving conditions, the increment value A is made "0.2", but the increment value A may be made a different value, according to the transient driving condition.

Figure 10:
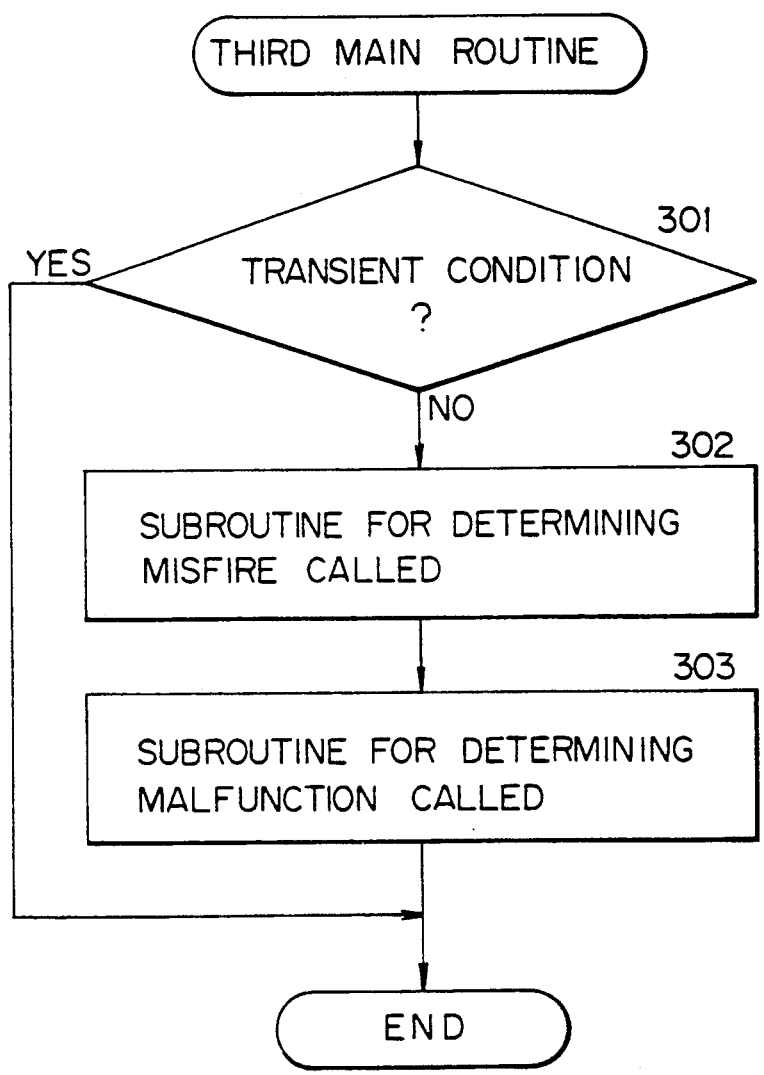
FIG. 10 is a third main routine for determining a malfunction of an engine cylinder.

FIG. 10 illustrates a third main routine for determining a malfunction of an engine cylinder. Referring to FIG. 10, at step 301 it is determined if the current engine driving condition is any one of the transient driving conditions as mentioned above. When the result is negative, the routine goes to step 302 and the subroutine for determining a misfire is called. Then, at step 303 the subroutine for determining a malfunction is called.

If the result at step 301 is affirmative, the routine is ended, and accordingly, when the current engine driving condition is a transient driving condition, the misfire count value CFn and the ignition count value CD are not incremented, and thus the same effects can be obtained as in the second main routine.

FIG. 14 shows the second internal combustion engine 1', wherein the only difference between the first engine shown in FIG. 1 and the second engine is explained as follows. The second engine 1' is connected mechanically to an automatic transmission 22. The output port 57 of an ECU 50' is also connected to the automatic transmission 22 via a drive circuit 80, and the input port 56 of the ECU 50' is also connected to a speed sensor 23 for detecting a current vehicle speed via an A/D converter 64. The ECU 50' usually controls the igniter and the injectors 8 as above-mentioned, and controls the automatic transmission 22 to obtain a good driving condition. Further, when a shift in the transmission 22 is carried out, the ECU 50' attempts to control a torque generated in the engine 1' to thus reduce shift shock. When the vehicle starts and accelerates on a snow-covered load and the like, the ECU 50' attempts to control a torque generated in the engine 1' by fuel cutting and the like, to prevent wheel spin caused by an excessing drive force. This is called traction control and ensures a directional stability of the vehicle. When an auto drive for maintaining a vehicle speed set by a driver is carried out, the ECU 50' attempts to control a torque generated in the engine 1' by controlling the opening of the throttle valve 12 on the basis of signals from the speed sensor 23 and the throttle sensor 13.

Figure 17A:
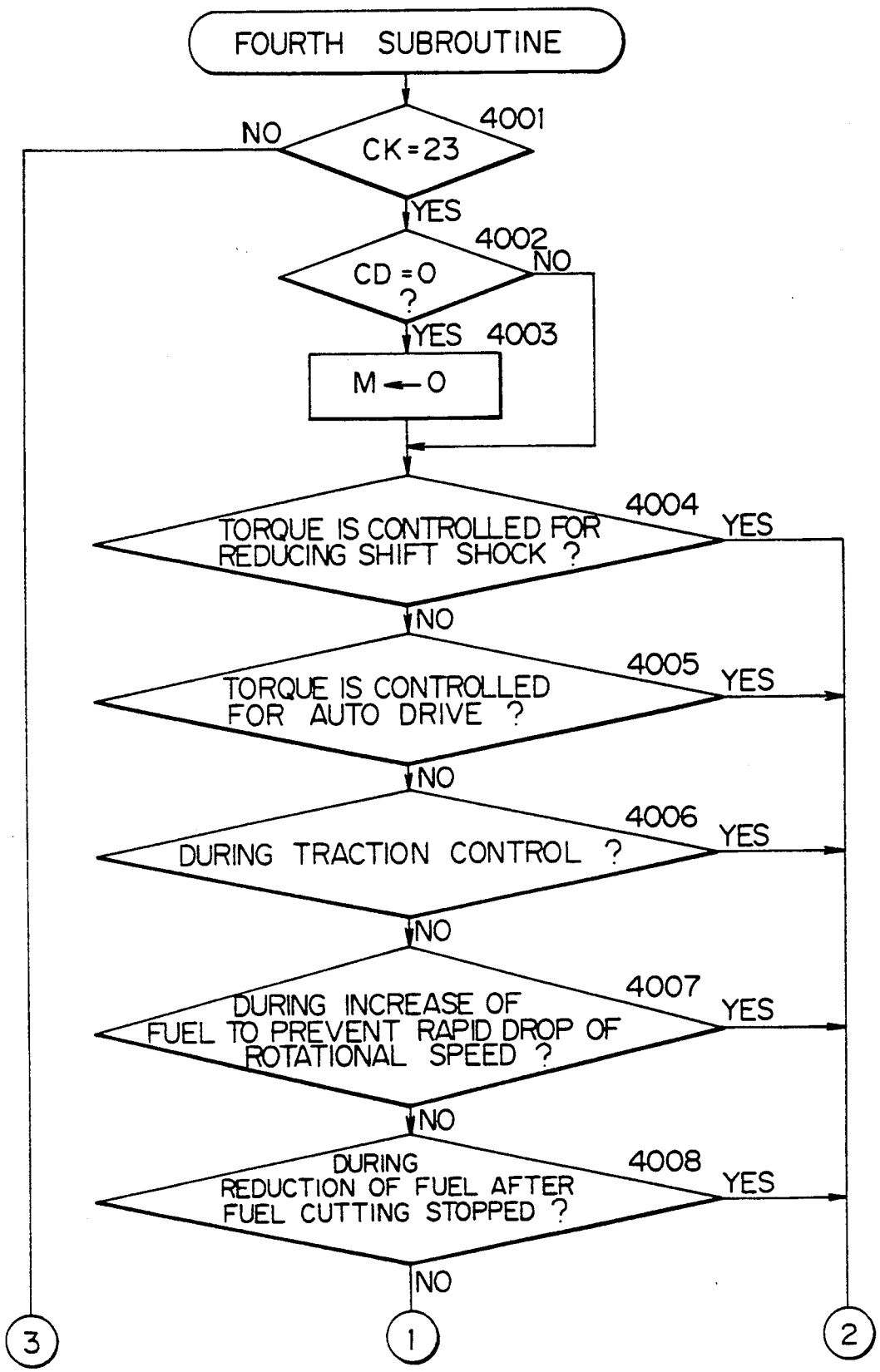
FIG. 17 (including parts A and B) is a fourth subroutine.
Figure 17B:
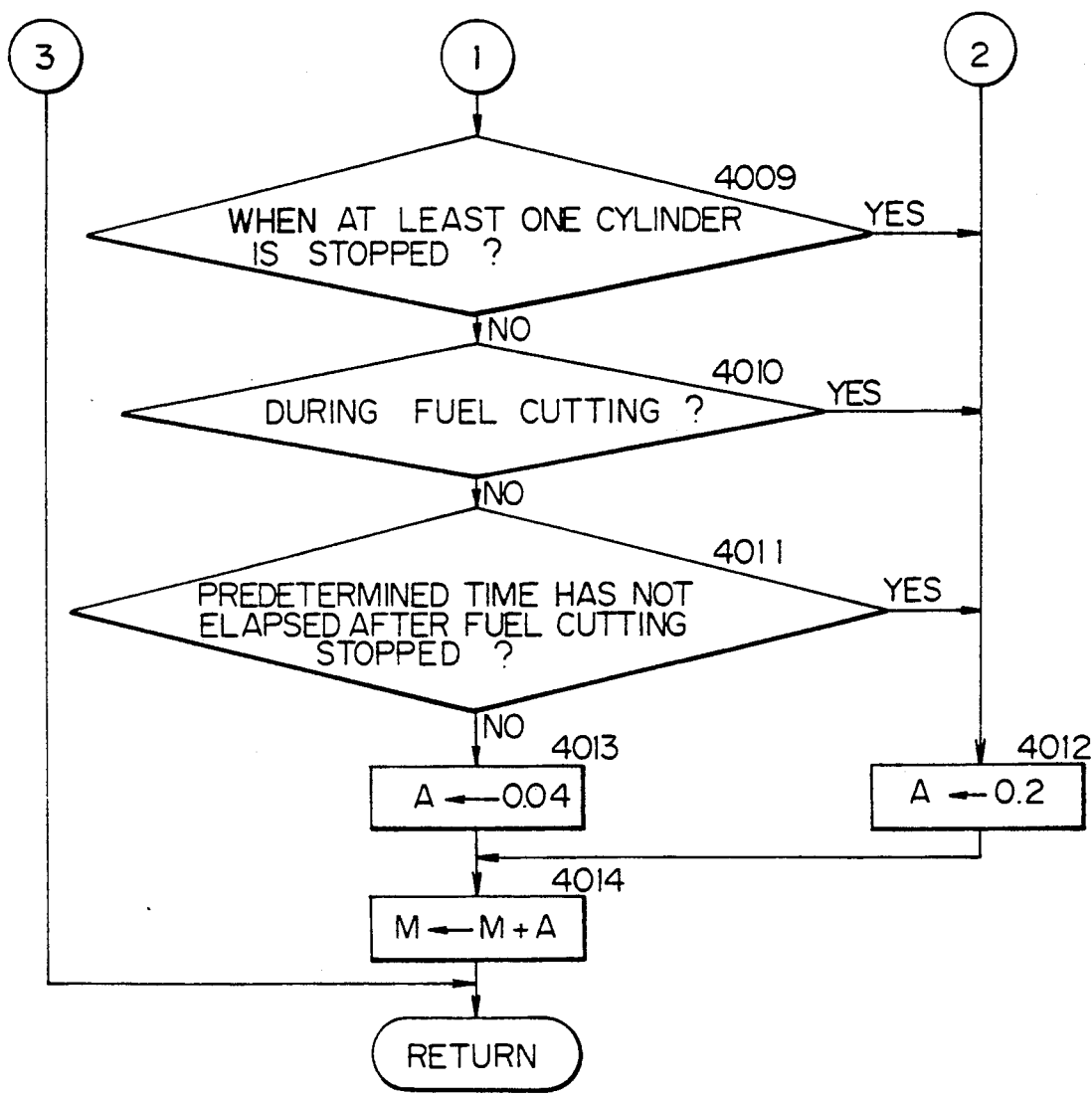

The ECU 50' also determines a malfunction of an engine cylinder according to the second main routine shown in FIG. 9, but in the case of the second internal combustion engine 1', at step 202 the subroutine for changing the malfunction determining value M, as a fourth subroutine, is called. The fourth subroutine is shown in FIG. 17. The difference between the third and fourth subroutines is explained as follows.

At step 4004, it is determined if the torque control for reducing shift shock is being carried out. When the result is negative, the routine goes to step 4005 and it is determined if a torque control for the auto drive is being carried out. When the result is negative, the routine goes to step 4006 and it is determined if the traction control is being carried out.

When the result is negative, the routine goes to step 4007 and it is determined if an increase of fuel to prevent a rapid drop of a rotational speed, is being carried out, when pressure on an accelerator pedal is suddenly relaxed to thus decelerate the engine. When the result is negative, the routine goes to step 4008 and it is determined if a reduction of fuel after the fuel cutting operation is stopped is being carried out. The reduction of fuel is carried out to prevent a rapid torque change after the fuel cutting is stopped.

When the result is negative, the routine goes to step 4009 and it is determined if at least one engine cylinder has been deliberately stopped. Note, in a low engine load driving condition, an amount of fuel injected to each cylinder is so small that the combustion in each cylinder is relative unstable. Accordingly, under this driving condition, at least one engine cylinder is stopped and only the other engine cylinders are driven, so that an amount of fuel injected to each driven engine cylinder becomes relatively high, whereby a good combustion in the driven engine cylinders and a desired torque can be obtained.

When the result at step 4009 is negative, the routine goes to step 4010 and it is determined if the fuel cutting operation is being carried out. When the result is negative, the routine goes to step 4011 and it is determined if the time elapsed after the fuel cutting operation was stopped has not reached a predetermined time. Note, immediately after the fuel cutting operation is stopped, the engine speed change is relatively large.

When any one of the results at steps 4004 to 4011 is affirmative, i.e., an engine torque is deliberately controlled, the routine goes to step 4012 and the increment value A for changing the malfunction determining value M is made "0.2", as in the third subroutine. When all of the results are negative, however, the routine goes to step 4013 and the increment value A is made "0.04", as in the third subroutine. Next, at step 4014, the malfunction determining value M is incremented by the increment value A "0.2" or "0.04".

When the engine torque is deliberately controlled, the engine speed changes beyond the assumption of the engine speed N and load Q/N. According to the fourth subroutine, when the engine torque is deliberately controlled, the value M can be made a suitable value as in the third subroutine.

Note, in the fourth subroutine, when the engine torque is deliberately controlled, the increment value A is made "0.2", but the increment value A may be made a different value according to the condition under which the torque is deliberately controlled.

Figure 11:
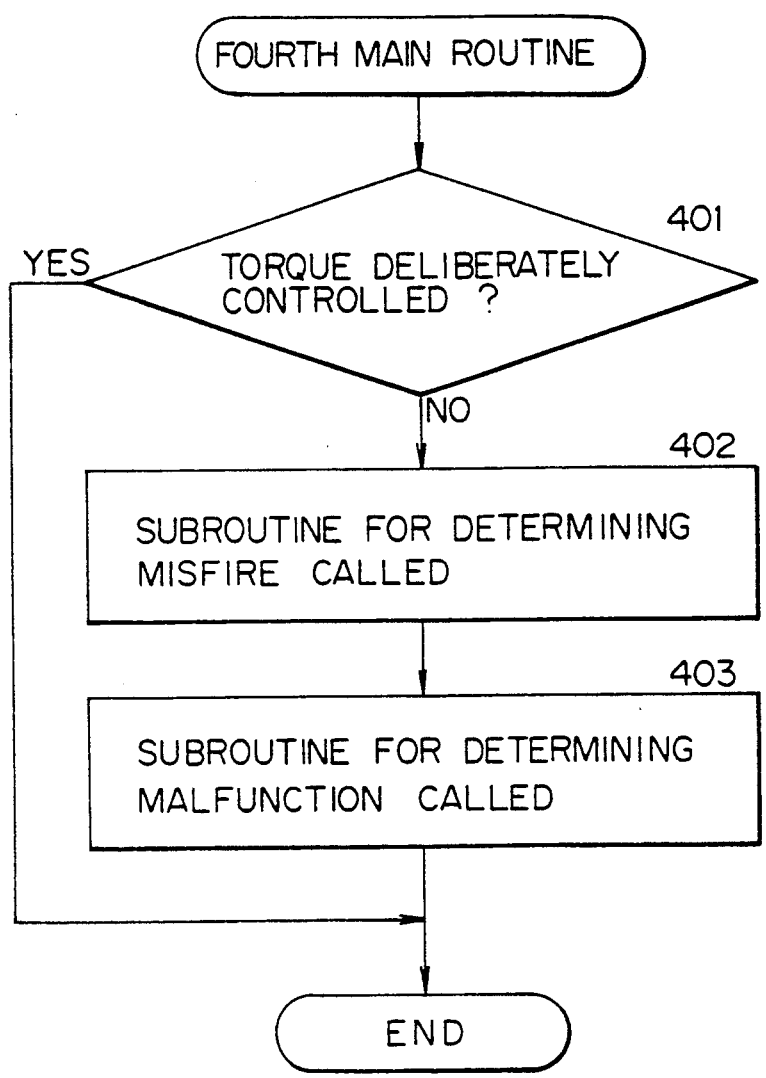
FIG. 11 is a fourth main routine for determining a malfunction of an engine cylinder.

FIG. 11 illustrates a fourth main routine for determining a malfunction of an engine cylinder. The only difference between the third and fourth main routines is explained as follows.

At step 401, it is determined if the engine torque is deliberately controlled, as mentioned above, and when the result is affirmative, the routine is ended. Therefore, when the torque is deliberately controlled, the misfire count value CFn and the ignition count value CD are not incremented, and accordingly, the same effects as those of the second main routine in the case of the second internal combustion engine 1' can be obtained.

Figure 5:
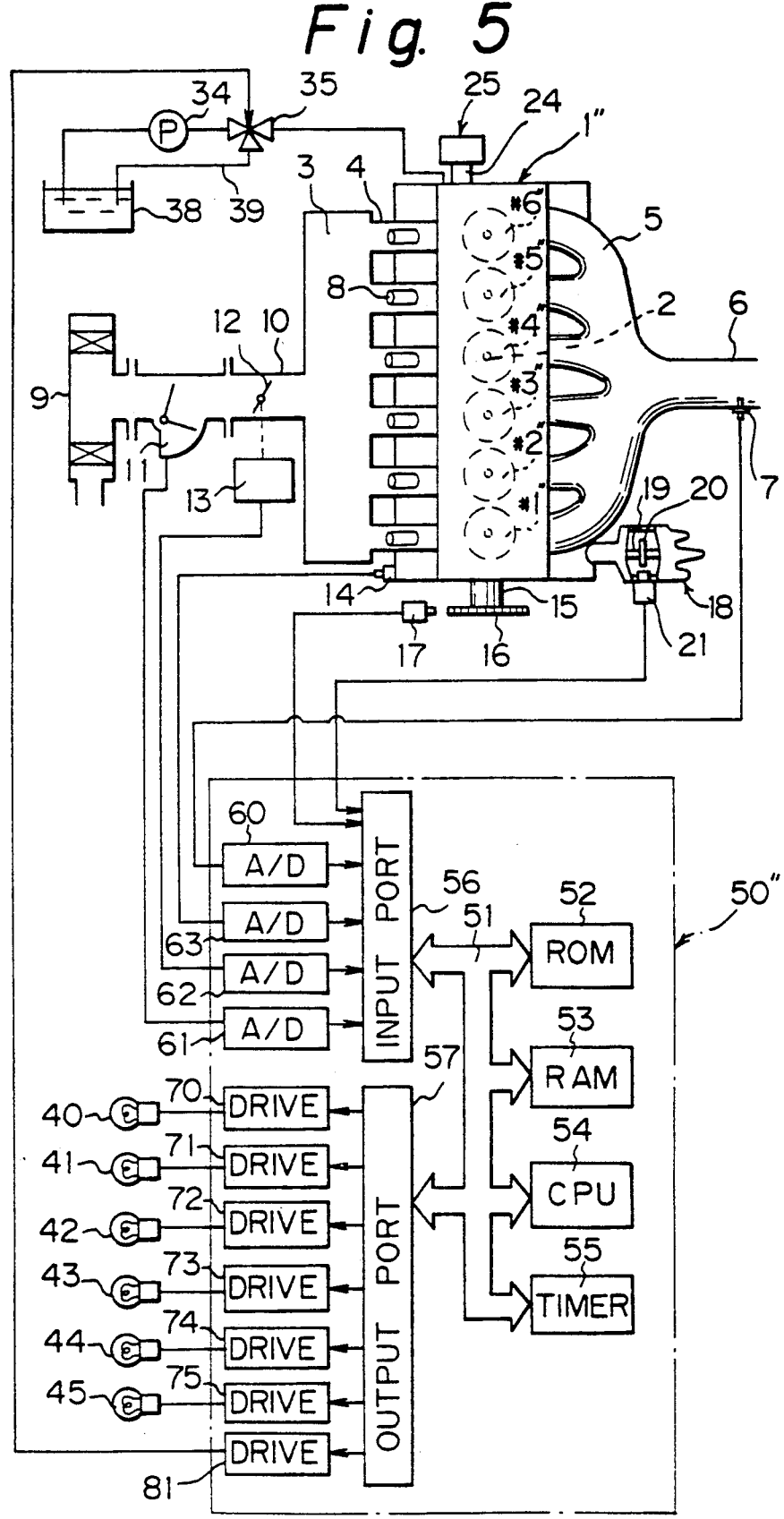
FIG. 5 is a schematic view of a third internal combustion engine.

FIG. 5 shows the third internal combustion engine 1", wherein the only difference between the first engine in FIG. 1 and the third engine is explained as follows.

The third engine 1" is provided with six cylinders: No.1 cylinder #1", the No.2 cylinder #2", the No.3 cylinder #3", the No.4 cylinder #4", the No.5 cylinder #5", and No.6 cylinder #6". An alarm lamp 44 showing that the No. 5 cylinder #5" has malfunctioned, and an alarm lamp 45 showing that the No. 6 cylinder #6" has malfunctioned, are also connected to the output port 57 of a ECU 50", via corresponding drive circuit 74 and 75.

A camshaft 24 for driving intake valves (not shown) extends from a cylinder head 1"a. The camshaft 24 is fitted with a control device 25 for controlling an overlap period when the intake valve and the exhaust valve (not shown) are opened simultaneously.

Figure 6:
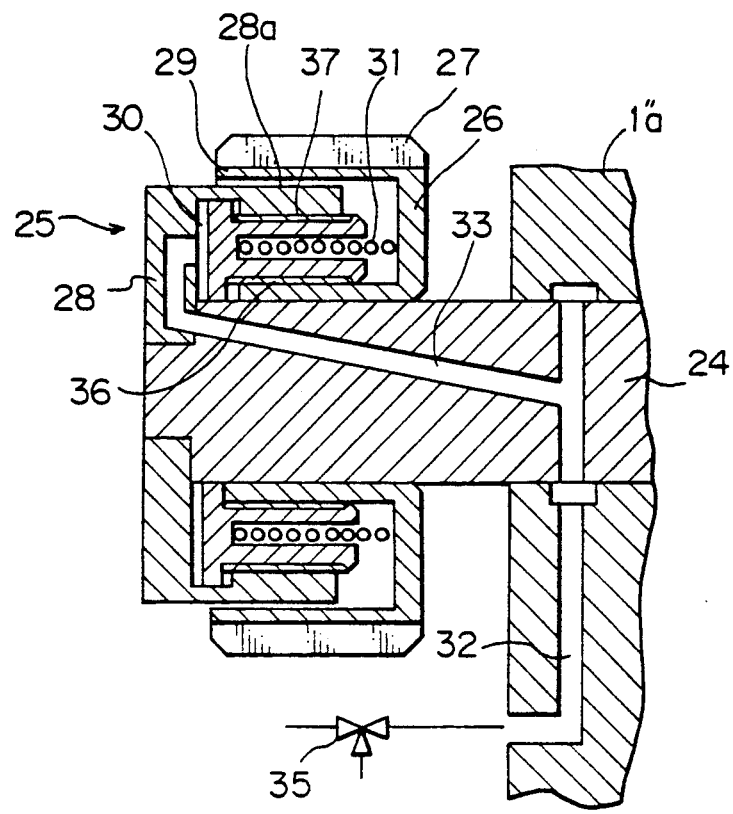
FIG. 6 is an expanded sectional view of a control device for controlling an overlap period.

FIG. 6 is an expanded sectional view of the control device 25. As shown in FIG. 6, the control device 25 comprises a timing pulley 26 rotatably mounted on the camshaft 24 and driven by the crankshaft 15 via a timing belt 27, a case 28 fixed to the camshaft 24 and having a outer portion 28a, a ring shaped piston 29 arranged between the timing pulley 26 and the case 28, a pressure chamber 30 defined by the case 28 and the piston 29, and a spring 31 biasing the piston 29 toward the pressure chamber 30.

The pressure chamber 30 is always communicated with a first oil passage 32 formed in the cylinder head 1"a, via a second oil passage 33 formed in the camshaft 24. As shown in FIG. 5, the first oil passage 32 is connected to the exhaust side of an oil pump 34, via an electromagnetic switching valve 35. The inside face of the piston 29 is engaged with the timing pulley 26 by splines 36, and the outside face of the piston 29 is engaged with the outer portion 28a of the case 28 by splines 37. The splines 36 and 37 are inclined to the axis of the camshaft 24, and extend in opposite directions to each other. Accordingly, when the piston 29 is moved in the longitudinal direction of the camshaft 24, the camshaft 24 is caused to rotate relative to the timing pulley 26.

Figure 7:
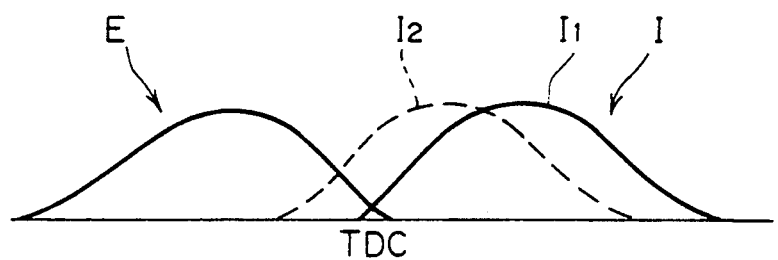
FIG. 7 is a graph showing lift amounts of an intake valve and an exhaust valve.

FIG. 7 shows a graph E of a lift amount of the exhaust valve and a graph I of a lift amount of the intake valve. When the pressure chamber 30 is communicated with a oil reservoir 38 by the electromagnetic switching valve 35, via the first and second oil passages 32, 33 and a oil return passage 39, the piston 29 is moved to the left most position in FIG. 6, by the spring 30. In this case, the graph of the lift amount of the intake valve is shown by I1 in FIG. 7. Further, when the pressure chamber 30 is communicated with the exhaust side of the oil pump 34 by the valve 35, via the first and second oil passages 32 and 33, the piston 29 is moved to the right most position in FIG. 6, by oil pressure. In this case, the graph of the lift amount of the intake valve is shown by I2 in FIG. 7. Accordingly, it can be understood that as the pressure in the pressure chamber 30 becomes higher, the overlap period during which the intake valve and exhaust valve are opened simultaneously becomes longer. In the third engine 1", the overlap period is controlled by the electromagnetic switching valve 35. The valve 35 is connected to the output port 57 of the ECU 50" via a drive circuit 81.

Note, when the engine load is relatively small, preferably a back flow of exhaust gases is minimized little, to thus obtain a stable combustion. Accordingly, when the opening of the throttle valve 12 is smaller than a set value S0, the overlap period is made shorter, as shown by I1 and E in FIG. 7.

Further, when the engine load is relatively large, preferably a charging efficiency is made larger to thus obtain a higher engine torque. Accordingly, when the opening of the throttle valve 12 is not smaller than the set value S0, the overlap period is made longer, as shown by I2 and E in FIG. 7.

Note, the lower the an engine temperature T, the more unstable the combustion. Accordingly, the set value S0 with respect to the water temperature T is stored in the form of a map shown in FIG. 24.

Figure 13:
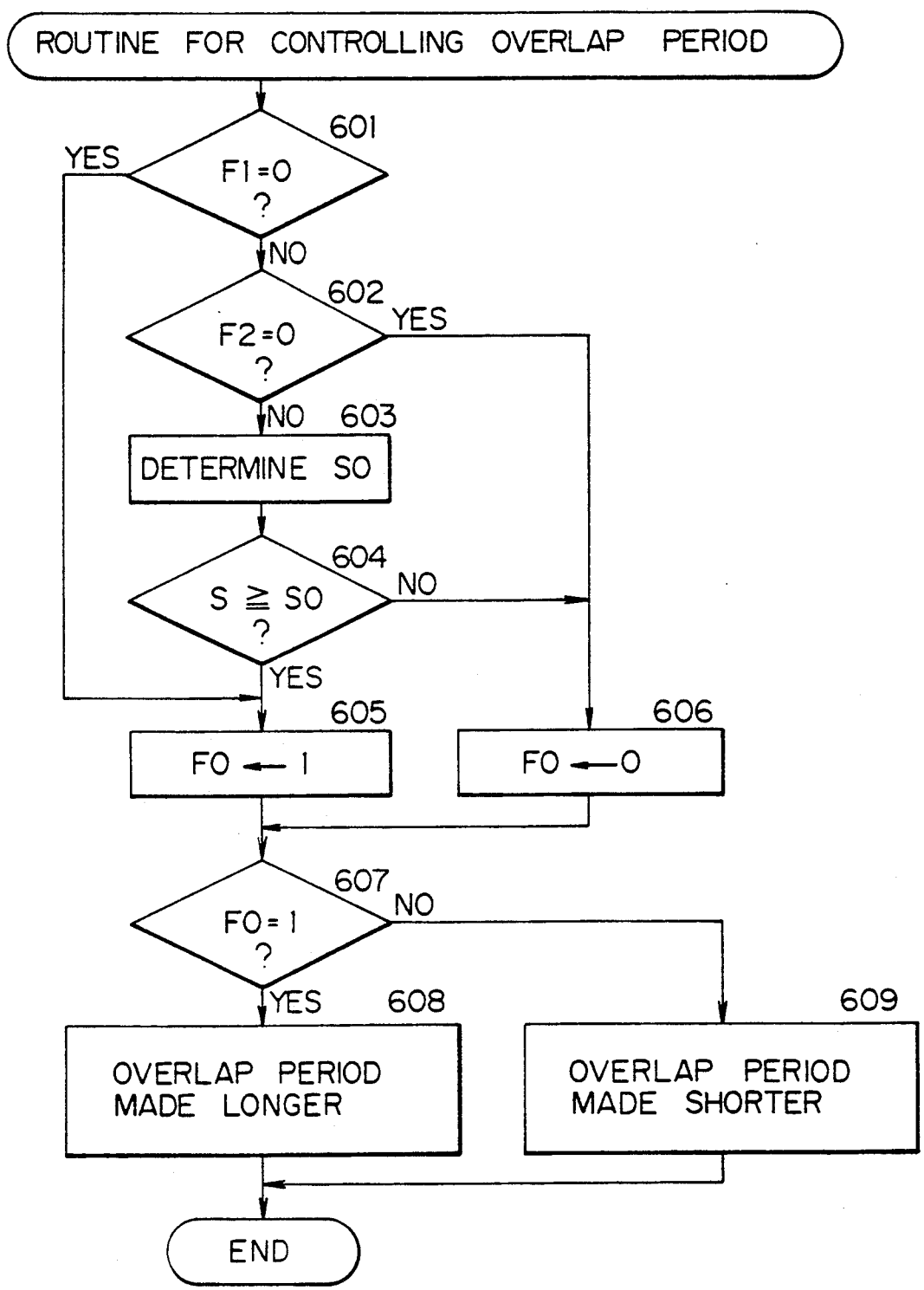
FIG. 13 is a routine for controlling an overlap period.

FIG. 13 illustrates a routine for controlling the overlap period. Referring to FIG. 13, at step 601 it is determined if a compulsion flag F1 for compulsorily making the overlap period long is "1". When the result is negative, the routine goes to step 602 and it is determined if a compulsion flag F2 for compulsorily making the overlap period short is "1".

Note that the compulsion flag F1 and flag F2 are set in a subroutine for determining a malfunction described hereafter. When the result at step 601 is affirmative, the routine goes to step 605 and an ON flag F0 is made "1", and the routine goes to step 607. When the result at step 602 is affirmative, the routine goes to step 606 and the ON flag is made "0", and the routine goes to step 607.

Figure 24:
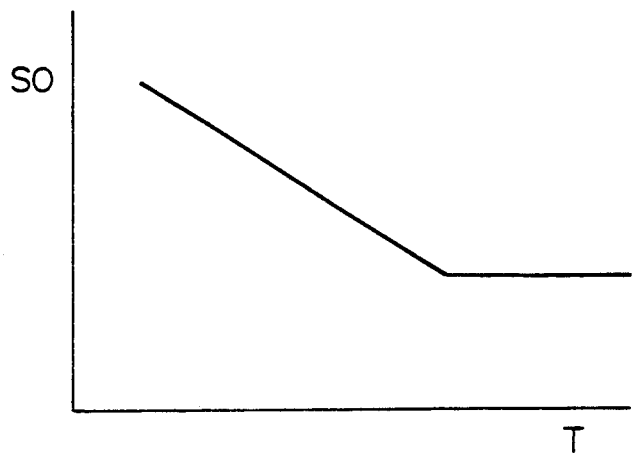
FIG. 24 is a map for determining an overlap period.

At step 602, when the result is negative, the routine goes to step 603 and the set value S0 is determined from the map showing in FIG. 24, on the basis of a signal from the water temperature sensor 14. Next, at step 604, it is determined if a current opening S of the throttle valve 12 is equal to or larger than the set value S. The current opening S is detected on the basis of a signal from the throttle sensor 13.

When the result is negative, the routine goes to step 606, when the result is affirmative, the routine goes to step 605. Then, at step 607, it is determined if the ON flag F0 is "1". When the result is affirmative, the routine goes to step 608 and the overlap period is made longer, as shown by I2 and E in FIG. 7. When the result is negative, the routine goes to step 609 and the overlap period is made shorter, as shown by I1 and E in FIG. 7.

Figure 18:
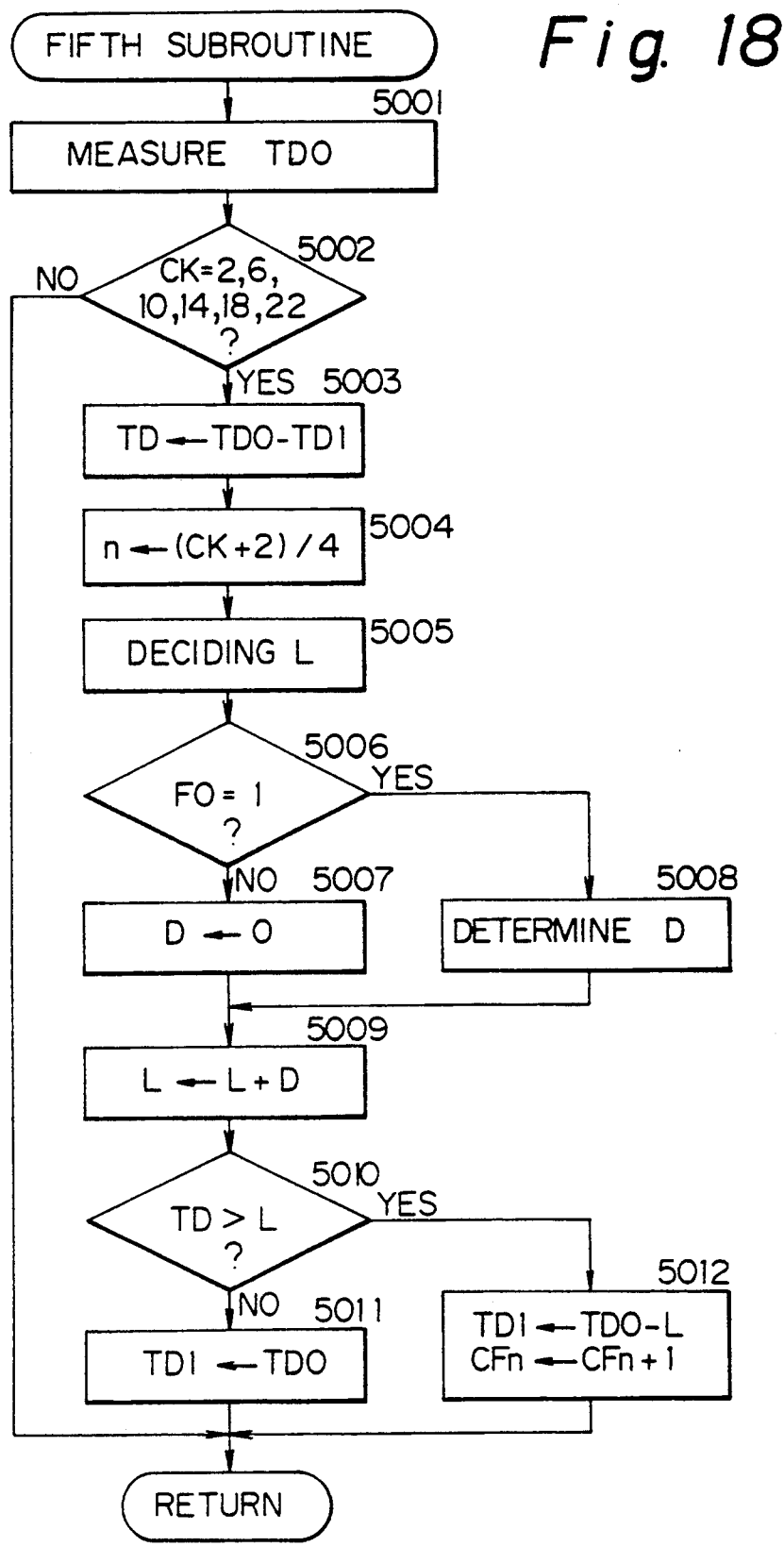
FIG. 18 is a fifth subroutine.

The ECU 50" also determines a malfunction of an engine cylinder according to the first main routine of FIG. 8. First, at step 101, the subroutine for determining a misfire, as a fifth subroutine, is called. The fifth subroutine is shown in FIG. 18. Referring to FIG. 18, at step 5001, the time T0 elapsed between this interruption and the previous interruption is measured by the timer 55, and at step 5002, it is determined if the crank angle count value is any one of "2", "6", "10", "14", "18", and "22". Note that the crank angle count value CK is calculated in the routine in FIG. 12, as mentioned above, and in the third engine 1" having six cylinders the ignition sequence is #1"-#5"-#3"-#6"#-2"-#4", and thus the crank arm angle in each cylinder with respect to the crank count value CK is shown as a second table in FIG. 23.

When the result at step 5002 is affirmative, i.e., the crank arm angle in any one of the cylinders #1", #2"#3", #4", #5", and #6" is at 30° degrees CA (cf. the second table shown in FIG. 23), the routine goes to step 5003 and a difference TD between a time TD0 and the time TD1 is calculated Note that the time T1 is a time elapsed from TDC to a 30° degrees crank arm angle in a normal functioning cylinder under the current engine speed and load, and is set at step 5011 or 5012.

Next, at step 5004, "2" is added to the crank angle count value CK and the result (CK+2) is divided by "4". The result "n" ((CK+2)/4) expresses the ignition sequence number of the engine cylinder.

Figure 26A:
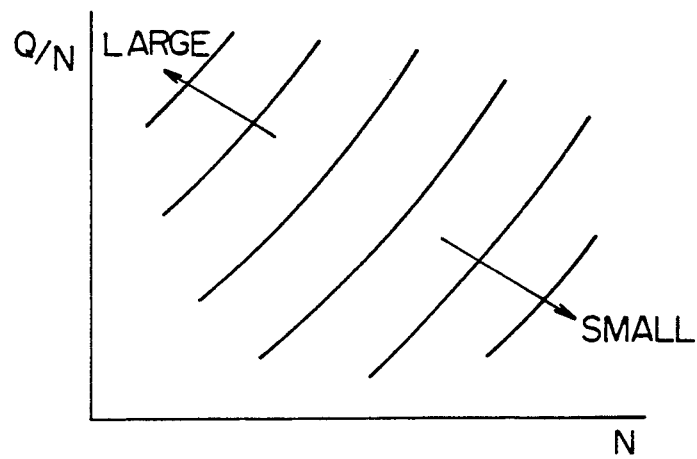
FIG. 26 (including parts A and B is a map for determining a misfire determining value L
Figure 26B:
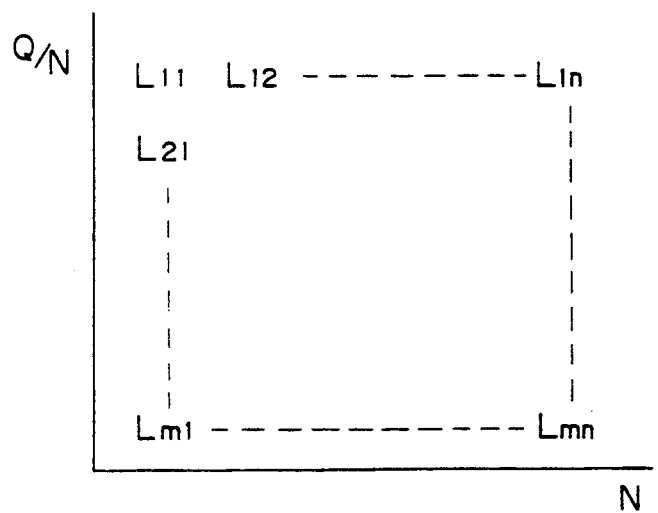

Then, at step 5005, a malfunction determining value L is determined from a map shown in FIG. 26(B), on the basis of a current engine speed N and load Q/N, and the routine goes to step 5006. FIG. 26(A) shows a tendency of the map in FIG. 26(B). At step 5006, it is determined if the ON flag F0 is "1". When the result is negative, i.e., the overlap period has been made shorter in the routine for controlling the overlap period, the routine goes to step 5007 and a revision value D for the malfunction determining value L is made "0". When the result at step 5006 is affirmative, i.e., the overlap period has been made longer in the routine for controlling the overlap period, the routine goes to step 5008 and the revision value D is calculated.

Note, in the above first subroutine, the difference TS between the time T0 elapsed from a 120° degrees to a 150° degrees crank arm angle in the engine cylinder, and the time T1 elapsed from TDC to a 30° degrees crank arm angle in the same engine cylinder, is used to determine that a misfire has occurred, but if this concept is applied to the six-cylinder engine, for example, the time T0' elapsed from a 60° degrees to a 90° degrees crank arm angle is used as T0 (cf. the second table shown in FIG. 23). Accordingly, the difference TS' (T0'−T1) is very small and thus it is difficult to determine the occurrence of a misfire by the difference TS'.

Accordingly, in the fifth subroutine, the difference TD between the times TD0 and TD1 elapsed from TDC to a 30° degrees crank arm angle in two successively fired engine cylinders, is used to determine the occurrence of a misfire.

Figure 25:
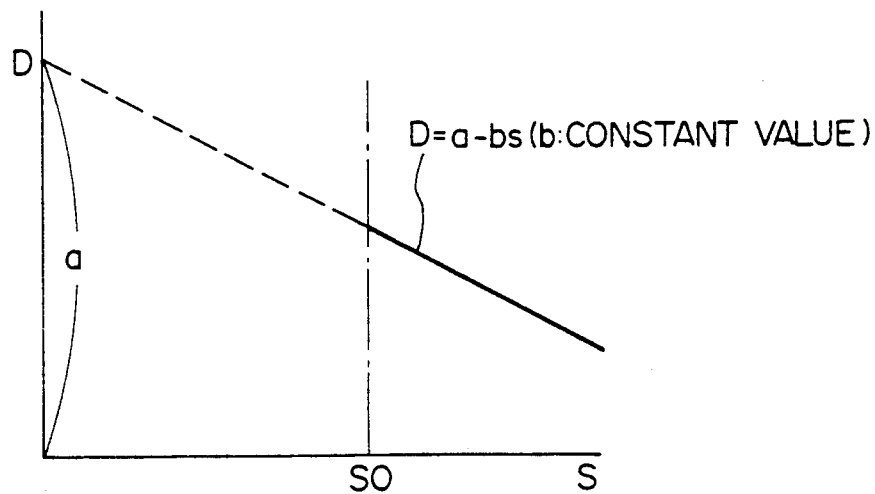
FIG. 25 is a map for determining a revision value D for a misfire determining value L.

Further, when the overlap period is made longer, the combustion often becomes somewhat unstable due to a lack flow of exhaust gases, even though a misfire has not occurred, and therefore, the misfire determining value L is incremented by the revision value D, to thereby prevent this unstable combustion caused by the back flow of exhaust gases being determined as a misfire. The revision value D may be constant, but to make the determining of a misfire more accurate, the revision value D is stored in the form of a map shown in FIG. 25. In the map, the larger the opening of the throttle valve 12, the smaller the revision value D. This is because, the larger the engine torque, the more stable the combustion even if a back flow of exhaust gases does occur.

Next, at step 5009, the misfire determining value L is incremented by the revision value D, and the routine goes to step 5010 and it is determined if the difference TD is larger than the malfunction determining value L. When the result is negative, the routine goes to step 5011 and it is determined that a misfire has not occurred in a corresponding engine cylinder, and the time T0 is memorized as the time T1 in the normal functioning cylinder.

When the result is affirmative, the routine goes to step 5012 and the misfire count value CFn of the corresponding engine cylinder is incremented by "1", and the misfire determining value L at this time is subtracted from the time T0 and the result (T0−L) is memorized as the time T1 in the normal functioning cylinder. Therefore, even if a misfire occurs simultaneously in two successively firing engine cylinders, it is possible to determine that the misfire occurred in the engine cylinder having delayed power stroke.

Figure 19A:
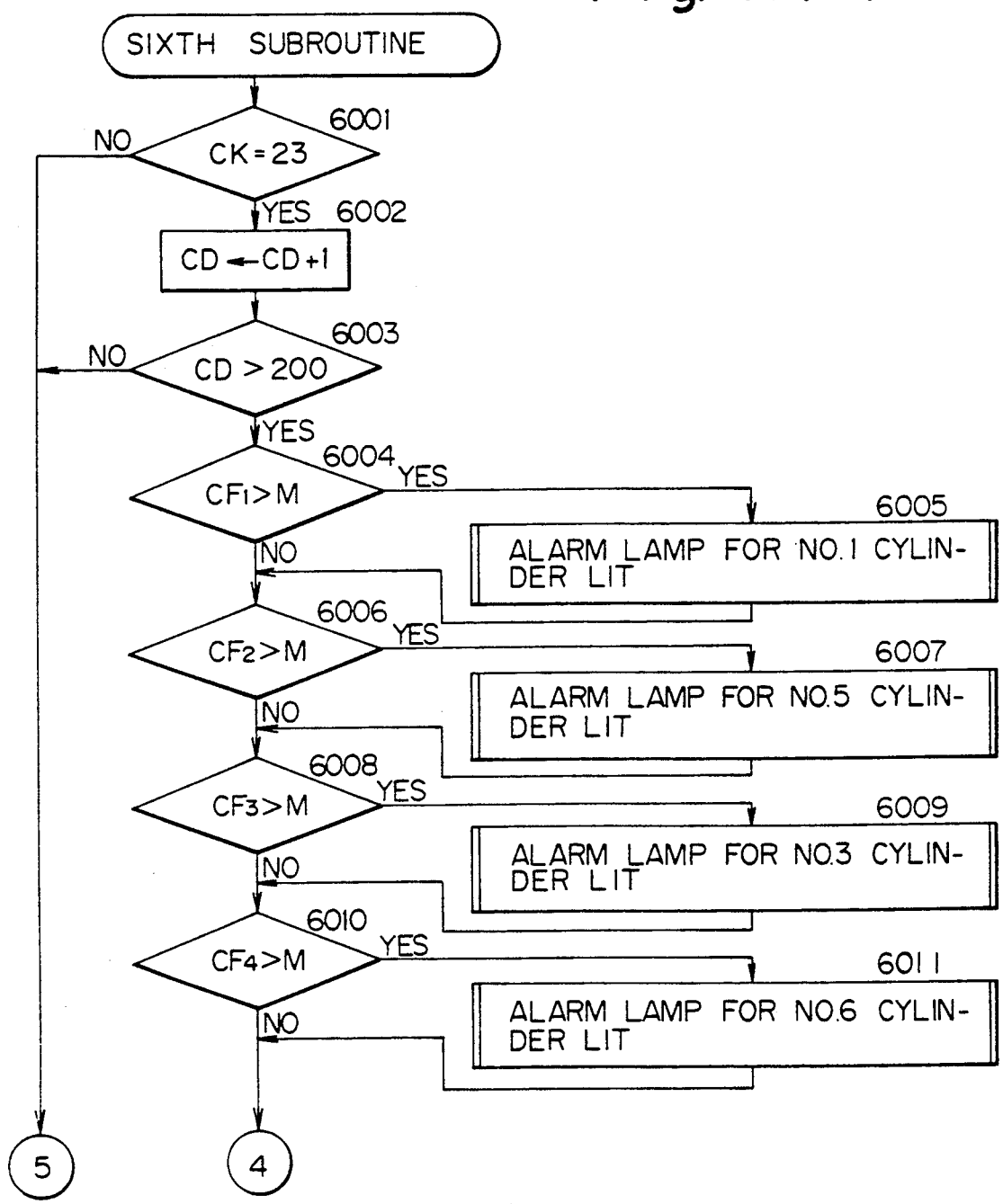
FIG. 19 (including parts A and B) is a sixth subroutine.
Figure 19B:
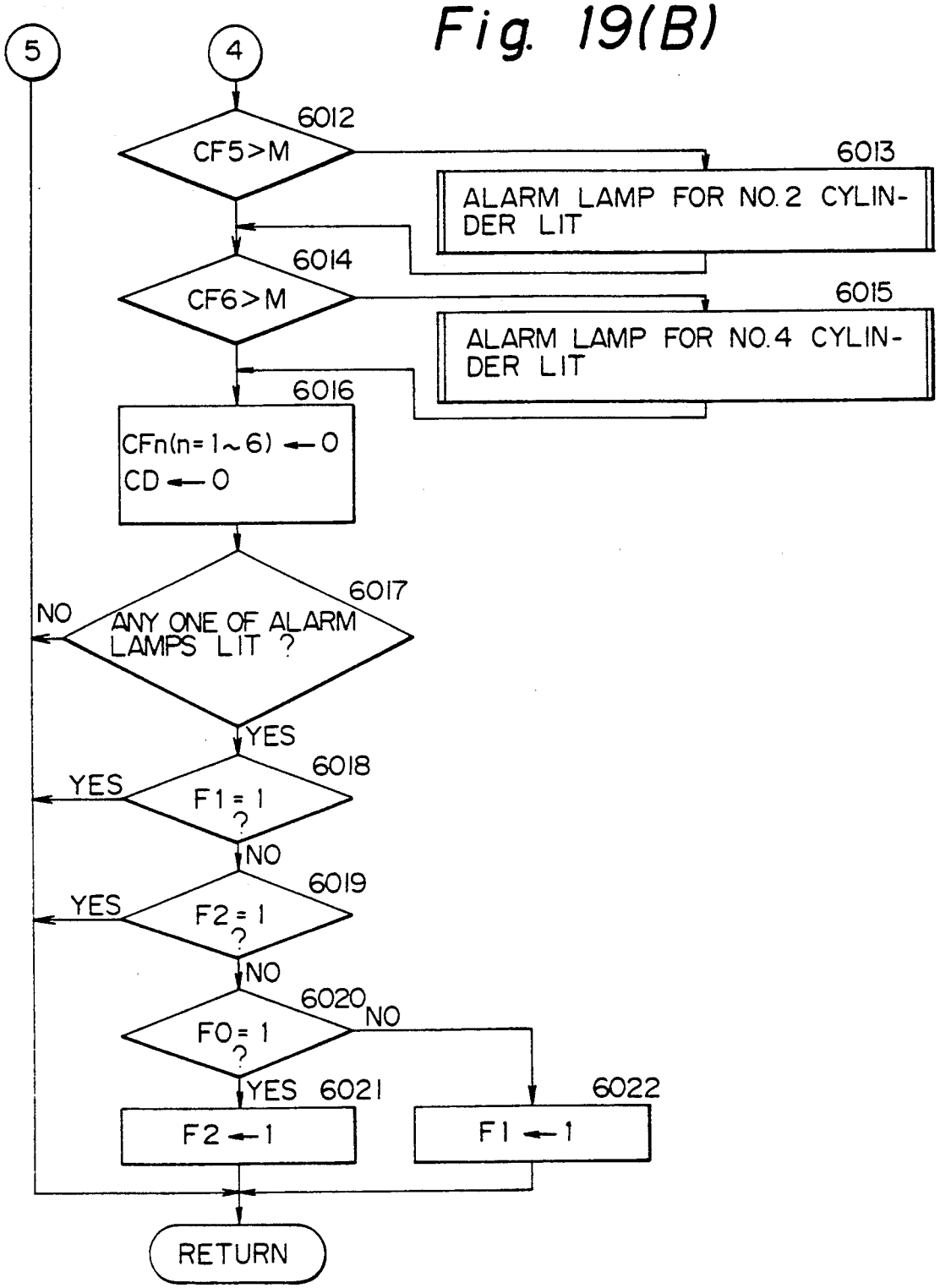

Next, the process returns to the first main routine and at step 102 the subroutine for determining a malfunction, as a sixth subroutine, is called. The sixth subroutine is shown in FIG. 19. The difference between the second and the sixth subroutines is explained as follows.

At step 6003, when the ignition count value CD reaches "200", the routine goes to step 6004 and it is determined if the misfire count value CF1 is larger than the malfunction determining value M. When the result is negative, the routine goes to step 6006, and when the result is affirmative, i.e., for No. 1 engine cylinder in the ignition sequence, the misfiring times during 200 ignition times is larger than the malfunction determining value M, the routine goes to step 6005 and it is determined that a malfunction has occurred in the No. 1 cylinder #1", and thus the alarm lamp 40 for No. 1 cylinder is lit.

Next, at step 6006, it is determined if the misfire count value CF2 is larger than the malfunction determining value M. When the result is negative, the routine goes to step 6008, and when the result is affirmative, i.e., for No. 2 engine cylinder in the ignition sequence, the misfiring times during 200 ignition times is larger than the malfunction determining value M, the routine goes to step 6007 and it is determined that a malfunction has occurred in the No. 5 cylinder #5", and thus the alarm lamp 44 for No. 5 cylinder is lit.

Next, at step 6008, it is determined if the misfire count value CF3 is larger than the malfunction determining value M. When the result is negative, the routine goes to step 6010, and when the result is affirmative, i.e., for No. 3 engine cylinder in the ignition sequence, the misfiring times during 200 ignition times is larger than the malfunction determining value M, the routine goes to step 6009 and it is determined that a malfunction has occurred in the No. 3 cylinder #3", and thus the alarm lamp 42 for No. 3 cylinder is lit.

Next, at step 6010, it is determined if the misfire count value CF4 is larger than the malfunction determining value M. When the result is negative, the routine goes to step 6012, and when the result is affirmative, i.e., for No. 4 engine cylinder in the ignition sequence, the misfiring times during 200 ignition times is larger than the malfunction determining value M, the routine goes to step 6011 and it is determined that a malfunction has occurred in the No. 6 cylinder #6", and thus the alarm lamp 45 for No. 6 cylinder is lit.

Next, at step 6012, it is determined if the misfire count value CF5 is larger than the malfunction determining value M. When the result is negative, the routine goes to step 6014, and when the result is affirmative, i.e., for No. 5 engine cylinder in the ignition sequence, the misfiring times during 200 ignition times is larger than the malfunction determining value M, the routine goes to step 6013 and it is determined that a malfunction has occurred in the No. 2 cylinder #2", and thus the alarm lamp 41 for No. 2 cylinder is lit.

Next, at step 6014, it is determined if the misfire count value CF6 is larger than the malfunction determining value M. When the result is negative, the routine goes to step 6016, and when the result is affirmative, i.e., for No. 6 engine cylinder in the ignition sequence, the misfiring times during 200 ignition times is larger than the malfunction determining value M, the routine goes to step 6015 and it is determined that a malfunction has occurred in the No. 4 cylinder #4", and thus the alarm lamp 43 for No. 4 cylinder is lit.

Next, at step 6016, the misfire count values CF1, CF2, CF3, CF4, CF5, CF6 and the ignition count value CD are made "0", and the routine goes to step 6017, and at step 6017 it is determined if any of the alarm lamps is lit. When the result is negative, the process returns to the first main routine. When the result at step 6017 is affirmative, i.e., one of the engine cylinders has malfunctioned, the routine goes to step 6018 and the compulsion flag F1 for compulsorily making the overlap period longer is "1". When the result is affirmative, the process returns to the first main routine. When the result at step 6018 is negative, the routine goes to step 6019 and the compulsion flag F2 for compulsorily making the overlap period shorter is "1". When the result is affirmative, the process returns to the first main routine.

When the result at step 6019 is negative, the routine goes to step 6020 and it is determined if the ON flag F0 is "1". When the result is affirmative, the routine goes to step 6021 and the compulsion flag F2 is made "1". When the result at step 6020 is negative, the routine goes to step 6022 and the compulsion flag F1 is made "1", and the process returns to the first main routine.

Note, a malfunction such as a serious misfiring usually occurs during one of the low and high engine load driving condition. If a malfunction occurs in one of the engine cylinders during the low engine load driving condition, the combustion in all cylinders during this driving condition is unstable from the beginning, and thus the engine can be stalled. If the malfunction occurs during the high engine driving condition, the overlap period is made longer, and thus an engine vibration is increased due to a back flow of exhaust gases.

According to the sixth subroutine, when a malfunction occurs in one of the engine cylinders during the low engine load driving condition, the overlap period is changed from short to long, and is kept at long, and thus the charging efficiency is increased, and accordingly, the engine torque is increased and the engine stalling is prevented.

When the malfunction occurs during the high engine load driving condition, the overlap period is changed from long to short, and is kept at short, to thereby reduce the back flow of exhaust gases, and accordingly, the engine vibration is decreased.

It will be understood that the concept of determining a misfire in the fifth subroutine can be applied to a four-cylinder engine, such as the first and second engines 1 and 1'

Note, in the third engine 1", another main routine can be used to determine a malfunction in an engine cylinder, whereby the malfunction determining value M is changed or the increment of the misfire count value CFn and the ignition count value CD is stopped, according to the various driving condition as above mentioned, so that the determining of a malfunction can becomes more accurate.

According to the present invention, it is possible to accurately determine an malfunctioning cylinder regardless of the various engine driving condition.

Although the invention has been described with reference to specific embodiments thereof, it should be apparent that numerous modifications can be made thereto by those skilled in the art, without departing from the basic concept and scope of the invention.

We claim:

1. A device for determining a malfunction of a cylinder of an internal combustion engine including a plurality of cylinders, the device comprising:

first detection means for detecting a first engine speed at a predetermined first crank angle, wherein the first crank angle is within a portion of a power stroke of a first cylinder, and a second engine speed at a predetermined second crank angle, wherein said second predetermined crank angle is within a corresponding portion of a power stroke of a second engine cylinder;

difference calculating means for calculating a difference between said first and second engine speeds;

misfire determining means for determining that a misfire has occurred in the engine cylinder in which the engine speed is smaller when said difference is larger than a predetermined limit;

malfunction determining means for determining that a malfunction has occurred in an engine cylinder when a frequency at which said misfire determining means determines that a misfire has occurred in the particular cylinder is larger than a predetermined frequency;

second detection means for detecting a current engine load; and first changing means for changing at least one of said predetermined limit and said predetermined frequency in accordance with the current engine load.

2. A device according to claim 1, further comprising engine condition detecting means for detecting a current engine driving condition, and second changing means for increasing said predetermined frequency when the current engine driving condition is a transient condition.

3. A device according to claim 1, further comprising fourth detecting means for detecting that an engine torque is deliberately controlled, and second changing means for increasing said predetermined frequency when the engine torque is deliberately controlled.

4. A device according to claim 1, further comprising engine condition detecting means for detecting a current engine driving condition, and stop means for stopping a determination by said misfire determining means, wherein said stop means stops a determination by said misfire determining means when the engine driving condition is a transient condition.

5. A device according to claim 4, wherein said transient condition is any one of a condition wherein an increase of fuel during a warming up of the engine is carried out, a condition that the time elapsed after the engine has started does not reach a predetermined time, a condition that the engine is rapidly accelerated or decelerated, and a condition that an ignition timing is delayed during the warming up of the engine.

6. A device according to claim 1, further comprising torque control detecting means for detecting that an engine torque is deliberately controlled, and stop means for stopping a determination by said misfire determining means, wherein said stop means stops a determination by said misfire determining means when the engine torque is deliberately controlled.

7. A device according to claim 6, wherein the engine torque is deliberately controlled, when any one of a shift in an automatic transmission is carried out, an auto drive for maintaining a vehicle speed set by a driver is carried out, a traction control is carried out, an increase of fuel is carried out to prevent a rapid drop of an engine speed when a pressure on an accelerator pedal is suddenly released, a reduction of fuel after a fuel cutting operation has been stopped is carried out to prevent a rapid torque change, at least one engine cylinder is stopped to obtain a good combustion in a low engine load driving condition, a fuel cutting operation is carried out, and the time elapsed after a fuel cutting operation has been stopped does not reach a predetermined time.

8. A device according to claim 1, further comprising overlap period control means for controlling a overlap period when intake and exhaust valves are opened simultaneously, overlap period changing means for changing said predetermined limit when the overlap period is made longer.

9. A device according to claim 8, further comprising temperature detecting means for detecting a current engine temperature, said overlap period changing means changing said predetermined limit, in accordance with a current engine temperature.

10. A device according to claim 1, wherein said first detection means comprises:
   a rotor rotating in synchronization with the crankshaft and having a plurality of detectable elements equiangularly arranged around said rotor;
   detecting means arranged to successively face said detectable elements and produce an output signal every time said detecting means faces each detectable element; and
   engine speed calculating means for calculating said first and second engine speeds on a basis of said output signal.

11. A device according to claim 10, wherein said engine speed calculating means calculates said first and second engine speed from a time between a generation of output signals by said detecting means.

12. A device according to claim 10, wherein the time between the generation of the output signals of said detecting means is used as a representative value showing said engine speed.

13. A device according to claim 10, wherein said detectable elements are comprised of outer teeth formed on an outer circumference of the said rotor.

14. A device according to claim 10, wherein said detecting means is comprised of an electromagnetic pickup.

15. A device according to claim 1, further comprising revision means for revising said second engine speed to an engine speed of a normal functioning engine cylinder after determining that a misfire has occurred in a corresponding engine cylinder.

16. A device according to claim 1, wherein said second detection means further detect a current engine speed, said first changing means changing at least one of said predetermined limit and said predetermined frequency in accordance with the current engine load and the current engine speed.

17. A device according to claim 1, further comprising second stop means for stopping a determination by said misfire determining means when the current engine condition is a transient condition.

18. A device according to claim 17, wherein the transient condition is a condition wherein an amount of fuel is increased during warming up of the engine.

19. A device according to claim 17, wherein the transient condition is a condition wherein a predetermined time has not elapsed since the engine has been started.

20. A device according to claim 17, wherein the transient condition is a condition wherein the engine is rapidly accelerated.

21. A device according to claim 17, wherein the transient condition is a condition wherein the ignition timing is delayed during the warming up of the engine.

22. A device according to claim 1, further comprising revision means for revising said second engine speed to an engine speed of a properly functioning engine after determining that a misfire has occurred in a respective cylinder.

23. A device for determining a malfunction of a cylinder of an internal combustion engine including a plurality of cylinders, the device comprising:
   first detection means for detecting a first engine speed at a predetermined first crank angle, wherein the first crank angle is within an initial portion of a power stroke of a cylinder, and a second engine speed at a predetermined second crank angle, wherein said second predetermined crank angle is within a latter portion of the power stroke of the same engine cylinder;
   difference calculating means for calculating a difference between said first and second engine speeds;
   misfire determining means for determining that a misfire has occurred in the engine cylinder in which the difference is smaller than a predetermined limit;
   malfunction determining means for determining that a malfunction has occurred in an engine cylinder when a frequency at which said misfire determining means determines that a misfire has occurred in the particular cylinder is larger than a predetermined frequency;
   second detection means for detecting a current engine driving condition; and
   stop means for stopping a determination by said misfire determining means, wherein said stop means stops a determination by said misfire determining means when the engine driving condition is a transient condition.

24. A device according to claim 23, further comprising engine torque detecting means for detecting a condition in which an engine torque is deliberately controlled.

25. A device according to claim 24, wherein the engine torque is deliberately controlled when a condition exists which is selected from the group consisting of:
   a shift in an automatic transmission;

an auto drive function for automatically maintaining a vehicle speed set by the driver is operating;

a traction control operation is being carried out;

an amount of fuel supplied to the engine is increased to prevent a rapid drop in engine speed when the pressure on the accelerator pedal is suddenly released;

an amount of fuel is reduced after a fuel cutting operation has been stopped;

at least one engine cylinder is inactivated in a low engine load condition;

a fuel cutting operation is in progress; and when the time elapsed since the end of a fuel cutting operation has not reached a predetermined time.

26. A device according to claim 23, further comprising overlap period control means for controlling an overlap period wherein intake and exhaust valves are opened simultaneously and an overlap period changing means for changing said predetermined limit when the overlap period is lengthened.

* * * * *

UNITED STATES PATENT AND TRADEMARK OFFICE
CERTIFICATE OF CORRECTION

PATENT NO. : 5,309,756
DATED     : May 10, 1994
INVENTOR(S): Kouichi OSAWA, et al.

It is certified that error appears in the above-identified patent and that said Letters Patent is hereby corrected as shown below:

ABSTRACT, line 4, change "a detecting" to --detecting a--.

Column 1, line 29, change "a" to --at--.

Column 2, line 66, change "a" to --an--.

Column 3, line 15, change "Outer" to --outer--.

Column 4, line 20, change "called The" to --called. The--.

Column 4, line 65, between "a" and "angle" insert --150 degree crank arm--.

Column 8, line 3, change "load" to --road--.

Column 8, line 5, change "excessing" to --excessive--.

Column 9, line 45, change "a" at end of line to --an--.

Column 10, line 1, change "a" to --an--.

Column 10, line 3, change "a" to --an--.

Column 11, line 42, change "degrees" to --degree--.

UNITED STATES PATENT AND TRADEMARK OFFICE
CERTIFICATE OF CORRECTION

PATENT NO. : 5,309,756
DATED : May 10, 1994
INVENTOR(S) : Kouichi OSAWA, et al.

It is certified that error appears in the above-identified patent and that said Letters Patent is hereby corrected as shown below:

Column 11, line 43, change "degrees" to --degree--.

Column 11, line 44, change "degrees" to --degree--.

Column 11, line 48, change "60 degrees" to --60 degree-- and "90 degrees" to --90 degree--.

Column 10, line 32, delete "an".

Column 14, line 12, change "an" to --a--.

Column 14, line 13, change "condition." to --conditions.--.

Column 15, line 29, change "a" to --an--.

Column 15, line 31, before "overlap" inser --and--.

Signed and Sealed this

Twenty-seventh Day of September, 1994

BRUCE LEHMAN

Attest:

Attesting Officer

Commissioner of Patents and Trademarks